US012705631B2

(12) United States Patent
Deng et al.

(10) Patent No.: US 12,705,631 B2
(45) **Date of Patent: *Aug. 11, 2026**

(54) DETECTING FRAUD USING MACHINE-LEARNING

(71) Applicant: PayPal, Inc., San Jose, CA (US)

(72) Inventors: Yuan Deng, Singapore (SG); Yanfei Dong, Singapore (SG)

(73) Assignee: PayPal, Inc., San Jose, CA (US)

( * ) Notice: Subject to any disclaimer, the term of this patent is extended or adjusted under 35 U.S.C. 154(b) by 868 days.

This patent is subject to a terminal disclaimer.

(21) Appl. No.: 18/049,929

(22) Filed: Oct. 26, 2022

(65) Prior Publication Data

US 2023/0070833 A1 Mar. 9, 2023

Related U.S. Application Data

(63) Continuation of application No. 16/732,031, filed on Dec. 31, 2019, now Pat. No. 11,488,177, which is a (Continued)

(51) Int. Cl.

| | |
|---|---|
| ***G06Q 30/018*** | (2023.01) |
| ***G06N 5/04*** | (2023.01) |
| ***G06N 20/00*** | (2019.01) |
| ***G06Q 40/02*** | (2023.01) |
| ***H04L 9/40*** | (2022.01) |

(52) U.S. Cl.

CPC ........... *G06Q 30/0185* (2013.01); *G06N 5/04* (2013.01); *G06N 20/00* (2019.01); *G06Q 40/02* (2013.01); *H04L 63/102* (2013.01)

(58) Field of Classification Search

CPC ...... G06Q 30/0185; G06Q 40/02; G06N 5/04; G06N 20/00; H04L 63/102

See application file for complete search history.

(56) References Cited

U.S. PATENT DOCUMENTS

| | | | |
|---|---|---|---|
| 7,984,012 | B2 | 7/2011 | Coury et al. |
| 10,936,658 | B2 | 3/2021 | Wu et al. |

(Continued)

FOREIGN PATENT DOCUMENTS

| | | | | |
|---|---|---|---|---|
| CN | 106650487 A | * | 5/2017 | ......... G06F 21/6245 |

OTHER PUBLICATIONS

E. Kurshan, H. Shen and H. Yu, "Financial Crime & Fraud Detection Using Graph Computing: Application Considerations & Outlook ,"2020 Second International Conference on Transdisciplinary AI (TransAI), Irvine, CA, USA, 2020, pp. 125-130 (Year: 2026).*

(Continued)

*Primary Examiner* — Sarah M Monfeldt
*Assistant Examiner* — Victor Chigozirim Esonu
(74) *Attorney, Agent, or Firm* — Kowert, Hood, Munyon, Rankin & Goetzel, P.C.; Catherine L. Gerhardt; Dean M. Munyon

(57) ABSTRACT

A fraud detection model is used by a computer system to evaluate whether to grant a request to access a secure electronic resource. Before granting the request, the computer system evaluates the request using a multi-partite graph model generated using a plurality of previous (Continued)

requests. The multi-partite graph model includes at least a first set of nodes for sender accounts, a second set of nodes for recipient accounts, and a third set of nodes.

20 Claims, 15 Drawing Sheets

Related U.S. Application Data continuation-in-part of application No. 16/399,008, filed on Apr. 30, 2019, now Pat. No. 11,308,497.

(56) References Cited

U.S. PATENT DOCUMENTS

| | | | | |
|---|---|---|---|---|
| 2010/0121792 | A1 | 5/2010 | Yang et al. | |
| 2010/0169137 | A1 | 7/2010 | Jastrebski et al. | |
| 2013/0117646 | A1 | 5/2013 | Hansen et al. | |
| 2017/0140382 | A1 * | 5/2017 | Chari | G06Q 20/389 |
| 2018/0032587 | A1 | 2/2018 | Abdelhamid et al. | |
| 2018/0060927 | A1 | 3/2018 | Gupta | |
| 2018/0196694 | A1 | 7/2018 | Banerjee et al. | |
| 2018/0349282 | A1 | 12/2018 | Brahm et al. | |
| 2019/0095806 | A1 | 3/2019 | Martinez Canedo et al. | |
| 2020/0082056 | A1 * | 3/2020 | Hasegawa | G06N 3/0464 |
| 2020/0193323 | A1 | 6/2020 | Alesiani et al. | |
| 2020/0226460 | A1 * | 7/2020 | Bruss | G06N 20/00 |
| 2020/0293878 | A1 | 9/2020 | Bhaskar et al. | |
| 2022/0394049 | A1 * | 12/2022 | Abrahamian | G06F 40/134 |

OTHER PUBLICATIONS

Brokmeier P., “An Overview of Categorical Input Handling for Neural Networks”, Towards Data Science, Jan. 15, 2019, 18 pages.
O’Reilly., “Chapter 1: What is Security Engineering,” Retrieved from Internet URL: https://www.oreilly.com/library/view/security-engineering-a/9780470068526/ch01.html, Apr. 14, 2008, 14 pages.
Shah N., et al., “EdgeCentric: Anomaly Detection in Edge-Attributed Networks,” Carnegie Mellon University, 2015, 11 pages.
Wang H., et al., “Deep Structure Learning for Fraud Detection”, 2018 IEEE International Conference on Data Mining, Nov. 2018, 11 pages.
Zheng M., et al., “FraudNE: a Joint Embedding Approach for Fraud Detection,” 2018 International Joint Conference on Neural Networks (IJCNN), 8 pages.
Representing Graphs with Low Dimensional Matrix Factorization for Fun and Pro, Posted on Mar. 30, 2018; http://danshiebler.com/2018-03-30-embeddings/, 6 pages. [Retrieved Apr. 2, 2019].
Ross Anderson, Security Engineering: A Guide to Building Dependable Distributed Systems, 3rd edition, Chapter 1, “What is Security Engineering?” 2020; https://www.cl.cam.ac.uk/~rja14/Papers/SEv2-c01.pdf; 14 pages.
Security engineering; From Wikipedia, the free encyclopedia; https://en.wikipedia.org/w/index.php?title=Security_engineering&oldid=1017168910; page last edited on Apr. 11, 2021; 5 pages. [Retrieved May 16, 2022].

* cited by examiner

400

402: Input: List $E$ of claiming actions, $e_i : (s, < txn_{xi}, claim_{yi} >, r)$
Initialize embedding lists of senders $S$ randomly: $\phi_{t=0}(s)\ \forall s \in S$
sort $\{e_0, \ldots, e_N\}$ by ascending timestamps for $i = 0 \rightarrow N_{epochs}$ do
  for $k = 0 \rightarrow N_{samples}$ do
    404: $\phi_{t=k}(s) = f(W_{data} x_{data} + g(W_{prev\_sender} \phi_{t=m}(s)))$
    if $\psi_{t=n}(r)$ does not exist then
      $\psi_{t=n}(r) = \phi_{t=k}(s)$
    end if
    406: $\psi_{t=k}(r) = f(U_{data} x_{data} + U_{sender} \phi_{t=k}(s) + U_{prev\_email} \psi_{t=n}(r))$
    408: $\mathcal{L} = \mathcal{F}(e_i) log(\sigma(W_{predict} \psi_{t=k}(r))) + (1 - \mathcal{F}(e_i)) log(1 - \sigma(W_{predict} \psi_{t=k}(r)))$
    Back propagate
  end for
end for

$x_{data} = < txn_{xi}, claim_{yi} >$, $m < k$, $t = m$ is the last time when sender node $s$ was updated. $n < k$, $t = n$ is the last time when sender node $s$ was updated. $f$ is an activation function such as ReLU, $\sigma$ is sigmoid function and $g$ is $tanh$ or other normalization function.

Input: claiming actions, $(s, < txn_x, claim_y >, r)$; embedding lists $\phi$ and $\psi$; embedding networks comprising of $W_{data}$, $W_{prev\_sender}$, $U_{data}$, $U_{sender}$, $U_{prev\_email}$, $W_{predict}$; threshold $th$ while *new claiming action* do

502 $\phi_{t=k}(s) = f(W_{data} x_{data} + g(W_{prev\_sender} \phi_{t=m}(s)))$ if $\psi_{t=n}(r)$ *does not exist* then

$\psi_{t=n}(r) = \phi_{t=k}(s)$ end

504 $\psi_{t=k}(r) = f(U_{data} x_{data} + U_{sender} \phi_{t=k}(s) + U_{prev\_email} \psi_{t=n}(r))$ 506 if $\sigma(W_{predict} \psi_{t=k}(r)) > th$ then

508 Return fraudulent else

510 Return legitimate end end

$x_{data} = < txn_x, claim_y >$, $m < k$, $t = m$ is the last time when sender node $s$ was updated. $n < k$ $t = n$ is the last time when sender node $s$ was updated $f$ is an activation function such as ReLU, $\sigma$ is sigmoid function and $g$ is $tanh$ or other normalization function.

Input: List $E$ of claiming actions, $e_i; (s; < txn_{xi}, claim_{yi} >, r, i)$
Initialize embedding lists of senders S randomly: $\phi_{t=0}(s) \forall s \in S$
sort $\{e_0, ..., e_N\}$ by ascending timestamps for $i = 0 \rightarrow N_{epochs}$ do
  for $k = 0 \rightarrow N_{samples}$ do
    1004 — $\phi_{t=k}(s) = f(W_{data} x_{data} + g(W_{prev\_sender} \phi_{t=m}(s)))$
    if $\psi_{t=n}(r)$ does not exist then
      $\psi_{t=n}(r) = \phi_{t=k}(s)$
    end if
    1006 — $\psi_{t=k}(r) = f(\mathcal{U}_{data} x_{data} + U_{sender} \phi_{t=k}(s) + \mathcal{U}_{prev\_email} \psi_{t=n}(r))$
    if $\theta_{t=n}(i)$ does not exist then
      $\theta_{t=l}(i) = \psi_{t=k}(r)$
    end if
    1008 — $\theta_{t=k}(i) = f(V_{data} x_{data} + V_{sender} \phi_{t=k}(s) + V_{email} \psi_{t=n}(r) + \mathcal{V}_{prev\_ip} \theta_{t=l}(i))$
    1010 — $\mathcal{L} = \mathcal{F}(e_i) log(\sigma(W_{predict} \theta_{t=k}(i) + (1 - \mathcal{F}(e_i)) log(1 - \sigma(W_{predict} \theta_{t=k}(i)))$
    Back propagate
  end for
end for

$x_{data} = (s; < txn_{xi}, claim_{yi} >, r, i)$, $m < k, t = m$ is the last time when sender node s is updated. $n < k, t = n$ is the last time when receiver node is updated. $l < k, t = l$ is the last time when requestor indicator node is updated. $f$ is an activation function such as ReLU, $\sigma$ is sigmoid function and $g$ is $tanh$ or other normalisation function.

Claiming actions, $(s; < txn_{xi}, claim_{yi} >, r, i)$;
Embedding lists $\phi$, $\psi$, and $\theta$; embedding networks comprising of $W_{data}; W_{prev\_sender}; \mathcal{U}_{data}; \mathcal{U}_{sender}; \mathcal{U}_{prev\_email}; V_{sender}; V_{email}; V_{prev\_ip}; W_{predict}$;
threshold $th$ while *new claiming action* do
1102 $\phi_{t=k}(s) = f(W_{data}x_{data} + g(W_{prev\_sender}\phi_{t=m}(s)))$
if $\psi_{t=n}(r)$ does not exist then
$\psi_{t=n}(r) = \phi_{t=k}(s)$
end if
1104 $\psi_{t=k}(r) = f(\mathcal{U}_{data}x_{data} + U_{sender}\phi_{t=k}(s) + \mathcal{U}_{prev\_email}\psi_{t=n}(r))$
if $\theta_{t=n}(i)$ does not exist then
$\theta_{t=l}(i) = \psi_{t=k}(r)$
end if
1106 $\theta_{t=k}(i) = f(V_{data}x_{data} + V_{sender}\phi_{t=k}(s) + V_{email}\psi_{t=n}(r) + V_{prev\_ip}\theta_{t=l}(i))$
1108 if $\sigma(W_{predict}\theta_{t=k}(i)) > th$ then
1110 Return fraudulent
else
1112 Return legitimate
end if
end while

$x_{data} = (s; < txn_{xi}, claim_{yi} >, r, i)$, $m < k, t = m$ is the last time when sender node s is updated. $n < k, t = n$ is the last time when receiver node is updated. $l < k, t = l$ is the last time when requestor indicator node is updated. $f$ is an activation function such as ReLU, $\sigma$ is sigmoid function and $g$ is $tanh$ or other normalisation function.

FIG. 11

DETECTING FRAUD USING MACHINE-LEARNING

CROSS REFERENCE

The present application is a continuation of U.S. application Ser. No. 16/732,031, entitled "DETECTING FRAUD USING MACHINE-LEARNING," filed Dec. 31, 2019 (now U.S. Pat. No. 11,488,177), which is a continuation-in-part of U.S. application Ser. No. 16/399,008, entitled "DETECTING FRAUD USING MACHINE-LEARNING," filed Apr. 30, 2019 (now U.S. Pat. No. 11,308,497), the disclosures of each of the above-referenced applications are incorporated by reference herein in their entireties.

BACKGROUND

Technical Field

This disclosure relates generally to security in computer systems, and more particularly detecting and mitigating fraudulent attempts to access computer systems.

Description of the Related Art

Security is a universal problem in computer systems, especially with computer systems connected to the Internet. Legitimate users of a computer system, through various means, may at times lose control of their accounts to malicious actors. Such malicious actors may, for example, fraudulently use a legitimate user's compromised account to access the computer system and engage in transactions. A compromised account may be used to access secure electronic resources, transfer money, or make purchases. After the fraud is detected, the computer system (or the entity operating the computer system) may have to mitigate the harm done by the malicious actor using the compromised account or make the legitimate user or third parties whole for fraudulent transactions.

SUMMARY

The present disclosure concerns using a fraud detection model to evaluate request to access electronic resources. In some embodiments, such requests are associated with a sender account of a computer system used to cause the computer system to generate link to the electronic resource and to send a message containing the link to a recipient account. The fraud detection model includes embedding values for various sender accounts of the computer system and various recipient accounts that have received messages containing links that were previously used to send requests to the computer system to access secure electronic resources. In various embodiments, the fraud detection model is a multipartite graph embedding model that uses node embedding to represent the various sender accounts and various recipient accounts with edges representing requests by connecting nodes for the sender account and the recipient account associated with the request. In various embodiments, the fraud detection model includes embedding values for various sender accounts of the computer system, various recipient accounts that have received messages containing links that were previously used to send requests to the computer system to access secure electronic resources, and various IP addresses from which previous claiming requests have been sent. In various embodiments, the fraud detection model is a multipartite graph embedding model that uses node embedding to represent the various sender accounts, various recipient accounts, and various IP addresses with edges representing requests by connecting nodes for the sender account and the recipient account associated with the request and by connecting nodes for the requesting IP address with the recipient account associated with the request. As requests are evaluated, the fraud detection model is adjusted by updating embedding values for nodes associated with incoming requests.

BRIEF DESCRIPTION OF THE DRAWINGS

FIG. 4 is a training algorithm for a fraud detection model in accordance with various embodiments.

FIG. 5 is an interference algorithm for a fraud detection model in accordance with various embodiments.

FIG. 10 is another training algorithm for a fraud detection model in accordance with various embodiments.

FIG. 11 is another interference algorithm for a fraud detection model in accordance with various embodiments.

Figure 1:
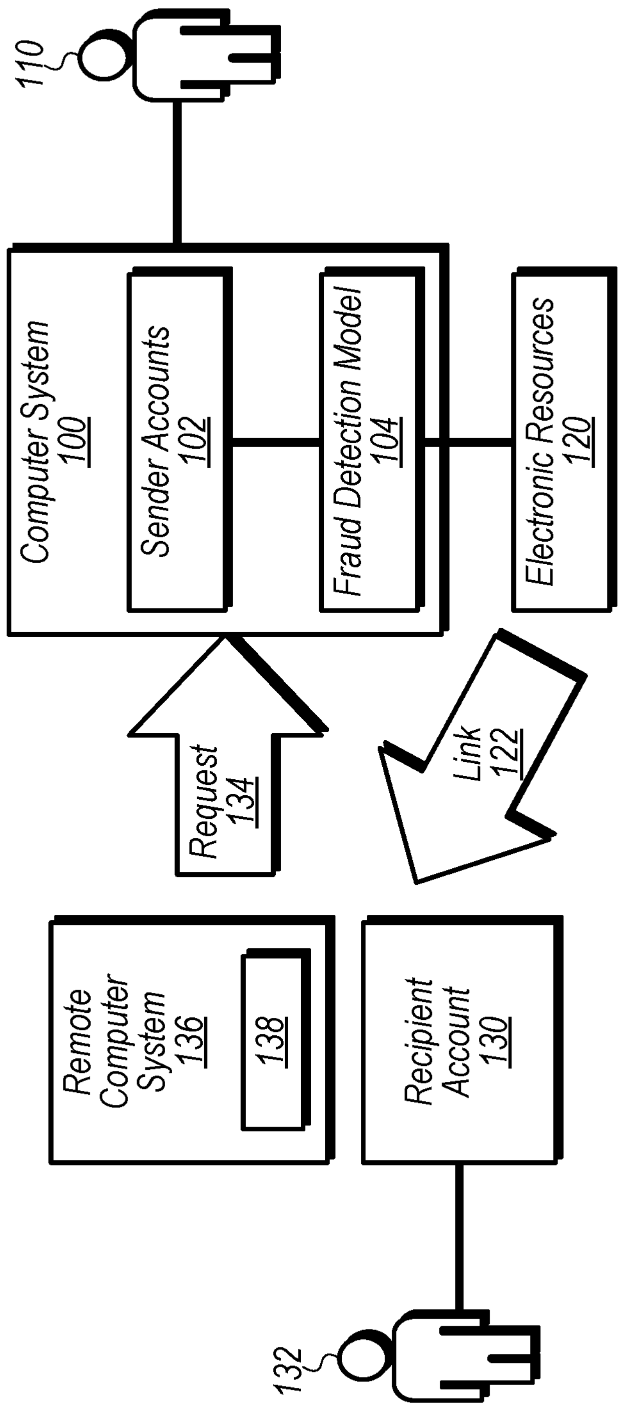
FIG. 1 is a block diagram illustrating an embodiment of a computer system configured to facilitate fraud detection in accordance with various embodiments.

This disclosure includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical, such as an electronic circuit). More specifically, this formulation is used to indicate that this structure is arranged to perform the one or more tasks during operation. A structure can be said to be "configured to" perform some task even if the structure is not currently being operated. A "computer system configured to receive a request" is intended to cover, for example, a computer system has circuitry that performs this function during operation, even if the computer system in question is not currently being used (e.g., a power supply is not connected to it). Thus, an entity described or recited as "configured to" perform some task refers to something physical, such as a device, circuit, memory storing program instructions executable to implement the task, etc. This phrase is not used herein to refer to something intangible. Thus, the "configured to" construct is not used herein to refer to a software entity such as an application programming interface (API).

The term "configured to" is not intended to mean "configurable to." An unprogrammed FPGA, for example, would not be considered to be "configured to" perform some specific function, although it may be "configurable to" perform that function and may be "configured to" perform the function after programming.

Reciting in the appended claims that a structure is "configured to" perform one or more tasks is expressly intended not to invoke 35 U.S.C. § 112(f) for that claim element. Accordingly, none of the claims in this application as filed are intended to be interpreted as having means-plus-function elements. Should Applicant wish to invoke Section 112(f) during prosecution, it will recite claim elements using the "means for" [performing a function] construct.

As used herein, the terms "first," "second," etc. are used as labels for nouns that they precede, and do not imply any type of ordering (e.g., spatial, temporal, logical, etc.) unless specifically stated. For example, references to "first" and "second" electronic resources would not imply an ordering between the two unless otherwise stated.

As used herein, the term "based on" is used to describe one or more factors that affect a determination. This term does not foreclose the possibility that additional factors may affect a determination. That is, a determination may be solely based on specified factors or based on the specified factors as well as other, unspecified factors. Consider the phrase "determine A based on B." This phrase specifies that B is a factor is used to determine A or that affects the determination of A. This phrase does not foreclose that the determination of A may also be based on some other factor, such as C. This phrase is also intended to cover an embodiment in which A is determined based solely on B. As used herein, the phrase "based on" is thus synonymous with the phrase "based at least in part on."

As used herein, the word "module" refers to structure that stores or executes a set of operations. A module refers to hardware that implements the set of operations, or a memory storing the set of instructions such that, when executed by one or more processors of a computer system, cause the computer system to perform the set of operations. A module may thus include an application-specific integrated circuit implementing the instructions, a memory storing the instructions and one or more processors executing said instructions, or a combination of both.

DETAILED DESCRIPTION

Referring now to FIG. 1, a block diagram illustrating an embodiment of a computer system 100 configured to facilitate fraud detection is depicted. Computer system 100 is configured to receive input from a sender user 110 and a recipient user 132. A link 122 to an electronic resource 120 is sent to a recipient account 130, and a request 134 to access the electronic resource 120 is sent to computer system 100. In various embodiments, link 122 (e.g., a uniform resource locator or URL) is sent in a message (e.g., an email message) to a recipient account 130 (e.g., an email account) to which recipient user 132 has access. Recipient user 132 accesses link 122 (e.g., by clicking the URL), resulting in request 134 being sent to computer system 100. As discussed herein, computer system 100 determines whether to grant the request 134 using a fraud detection model 104.

In various embodiments, computer system 100 is any of a number of computers, servers, or cloud platforms that a service provider (e.g., a service provider for a financial transaction platform, a service provider for a file sharing platform, a network security service provider, etc.) uses to facilitate transactions made by sender users 110 with their respective sender accounts 102. In various embodiments, computer system 100 is a dedicated computer system for the service provider, but in other embodiments computer system 100 is implemented in a distributed cloud computing platform. In various embodiments, computer system 100 is configured to perform various operations discussed herein with reference to FIGS. 2-14.

In various embodiments, sender accounts 102 belong to respective sender users 110 to facilitate transactions on computer system 100. In some embodiments, sender account 102 is associated with financial information of sender user 110 to facilitate purchases made using sender account 102 on the service provider's platform (e.g., purchases of digital gift cards). In other embodiments, sender account 102 is associated with secure files stored by sender user 110 using computer system 100.

Fraud detection model 104 is implemented by computer system 100 to evaluate incoming requests 134 to access electronic resources 120. In various embodiments, fraud detection model 104 is used by computer system 100 to evaluate requests 134 before granting such requests to access electronic resources 120. In various embodiments, fraud detection model 104 is generated by receiving a plurality of previous requests 134 and sequentially generating embedding values for the fraud detection model 104 that correspond to the sender account 102 and recipient account 130 associated with each respective request 134. In various embodiments, generating fraud detection model 104 also includes generating embedding values for the fraud detection model 104 that correspond to requestor indicators 138 associated with remote computer systems 136 associated with request 134.

As discussed herein, the various embedding values represent the various sender accounts 102, recipient accounts 130, and (in some embodiments) requestor indicators 138 within the model 104 using a reduced number of dimensions relative to the number of dimensions in which the requests 134 are captured. In various embodiments, fraud detection model 104 is trained using indications that ones of the plurality of past requests 134 were fraudulent. In various embodiments, such indications include but are not limited to fraudulent activity reports from sender users 110 or from third-parties (e.g., a digital storefront at which an attacker attempted to use a fraudulent gift card) or from a security evaluation of computer system 100 (e.g., an evaluation indicating that a particular sender account 102 was compromised). In various embodiments, requests 134 are added to fraud detection model 104 sequentially (e.g., in the order they were generated, in the order in which they were received by computer system 100). As discussed in further detail herein, in various embodiments, evaluating an incoming request 134 includes updating embedding values for the sender account 102, recipient account 130, and (in some embodiments) requestor indicators 138 associated with the incoming request 134 as well as predicting whether the incoming request 134 (and/or the recipient account 130 and/or requestor indicators 138) is suspected of fraud. In various embodiments, embedding values for new recipient accounts 130 (and in some embodiments requestor indicators 138) are added to fraud detection model 104 when embedding values for these new recipient accounts 130 (and in some embodiments requestor indicators 138) were not previously in fraud detection model. Fraud detection model 104 is discussed in further detail with reference to FIGS. 3-14. In various embodiments, fraud detection model 104 is a multi-partite graph model with at least two sets of nodes (discussed in connection to FIG. 3-8) or with at least three sets of nodes (discussed in connection to FIGS. 9-14).

Electronic resources 120 are any of a number of codes, digital files, secured domains or websites, or other information stored digitally. In various embodiments, electronic resources 120 are stored at computer system 100, but in other embodiments they are stored on third-parties computer systems (e.g., on a server associated with a storefront for a digital gift card). In various embodiments, electronic resources 120 are financial instruments that are purchased using a sender account 102 (e.g., a digital gift card for a physical or virtual store, a pre-paid debit card, a coupon or discount). In other embodiments, electronic resources 120 are digital files uploaded using sender account 102. In still other embodiments, electronic resources 120 are secured domains or websites to which sender account 102 is used to send a link 122.

In response to receiving a command from a sender account 102 to perform a transaction and to send a link 122 to a recipient account 130, computer system 100 generates link 122 (e.g., a URL) to the electronic resource 120. In various embodiments, computer system 100 prepares as a message containing link 122 (e.g., an email message including a URL) and sends it to recipient account 130. In other embodiments, computer system 100 provides link 122 to sender user 110 for sender user 110 to forward to recipient account 130. In various embodiments, activating link 122 with a remote computer system 136 causes the remote computer system 136 to send a request 134 to computer system 100. Request 134 is a request sent from a remote computer system 136 to computer system 100 to access an electronic resource 120 (e.g., to download a webpage linked to by link 122, to download one or more files linked to by link 122, to redeem a digital gift card) in various embodiments. As discussed herein, each request 134 is associated with the sender account 102 used to send the message with link 122 (and to conduct the transaction) and the recipient account 130 to which the message with link 122 was sent. In various embodiments, requests 134 are used to "claim" access to an electronic resource 120, and thus may be referred to herein as a "claiming actions."

In various embodiments, remote computer system 136 is any of a number of computing devices including but not limited to a laptop computer, a desktop computer, a server, a smartphone, a tablet computer, or a wearable computer. In various embodiments, remote computer system 136 is associated with one or more requestor indictors 138 that identify the remote computer system 136 in communication with other computer systems (e.g., computer system 100). In various embodiments, such requestor indicators 1380 include but are not limited to one or more internet protocol (IP) addresses, one or more media access control (MAC) addresses, one or more manufacturer's serial numbers, or other unique identifiers. In various embodiments, one or more requestor indictors 138 is included in (or associated with) request 134. For example, the IP address of remote computer system 136 is included in request 134 in various embodiments.

Recipient account 130 is any of a number of electronic accounts that can receive a message including link 122. In various embodiments, recipient account 130 includes but is not limited to an email account, an instant messaging or chat account, a social medial account, a telephone account (e.g., a telephone account for a mobile device configured to receive text messages). Recipient user 132 can be any natural person with access to recipient account 130 directly or through software intermediaries. As discussed herein, in some instances, recipient user 132 is associated with sender user 110 (e.g., a friend, colleague, vendor, customer, family member) and sender user 110 uses sender account 102 to command computer system 100 to send the message containing link 122 to a recipient account 130 associated with recipient user 132. In other instances, however, sender account 102 has been compromised and has been fraudulently used to send the message containing link 122 to a recipient account 130 associated with a recipient user 132 associated with the attackers.

Accordingly, the disclosed techniques may enable computer system 100 to prevent fraudulent requests 134 from being granted and avoid the harm that might have been done. In some instances, such harm may be financial and/or reputational to the service provider operating computer system 100. Moreover, using the techniques disclosed herein, requests 134 may be evaluated in a scalable manner such that numbers of requests 134 on the order of thousands or millions can be quickly evaluated with minimal user interaction. Further, subsequent evaluation of requests 134 may provide indications that a previously-granted request 134 might have been fraudulent and warrant investigation. Using the fraud detection model 104, computer system 100 is able to intercept requests 134 as discussed herein. In various embodiments, computer system 100 is also able to identify sender accounts 102 that may be compromised and to cut off access to electronic resources 120 pending further investigation or verification by sender user 110. In various embodiments, computer system 100 is also able to generate a blacklist of recipient accounts 130 (and in some embodiments requestor indicators 138) that are suspected of being associated with fraud and denying all requests from such recipient accounts 130 pending further investigation or verification by sender user 110 and/or recipient user 132. The added security from evaluating request 134 may encourage additional sender users 110 to make use of the system 100 as discussed herein. Finally, by leveraging machine-learning techniques, the fraud detection model 104 is quickly able to adapt to changing conditions (e.g., identify newly compromised sender accounts 102, new recipient accounts 130 that are associated with fraud, identify transaction patterns that indicate a new modus operandi of malicious actors) and respond accordingly.

Figure 2:
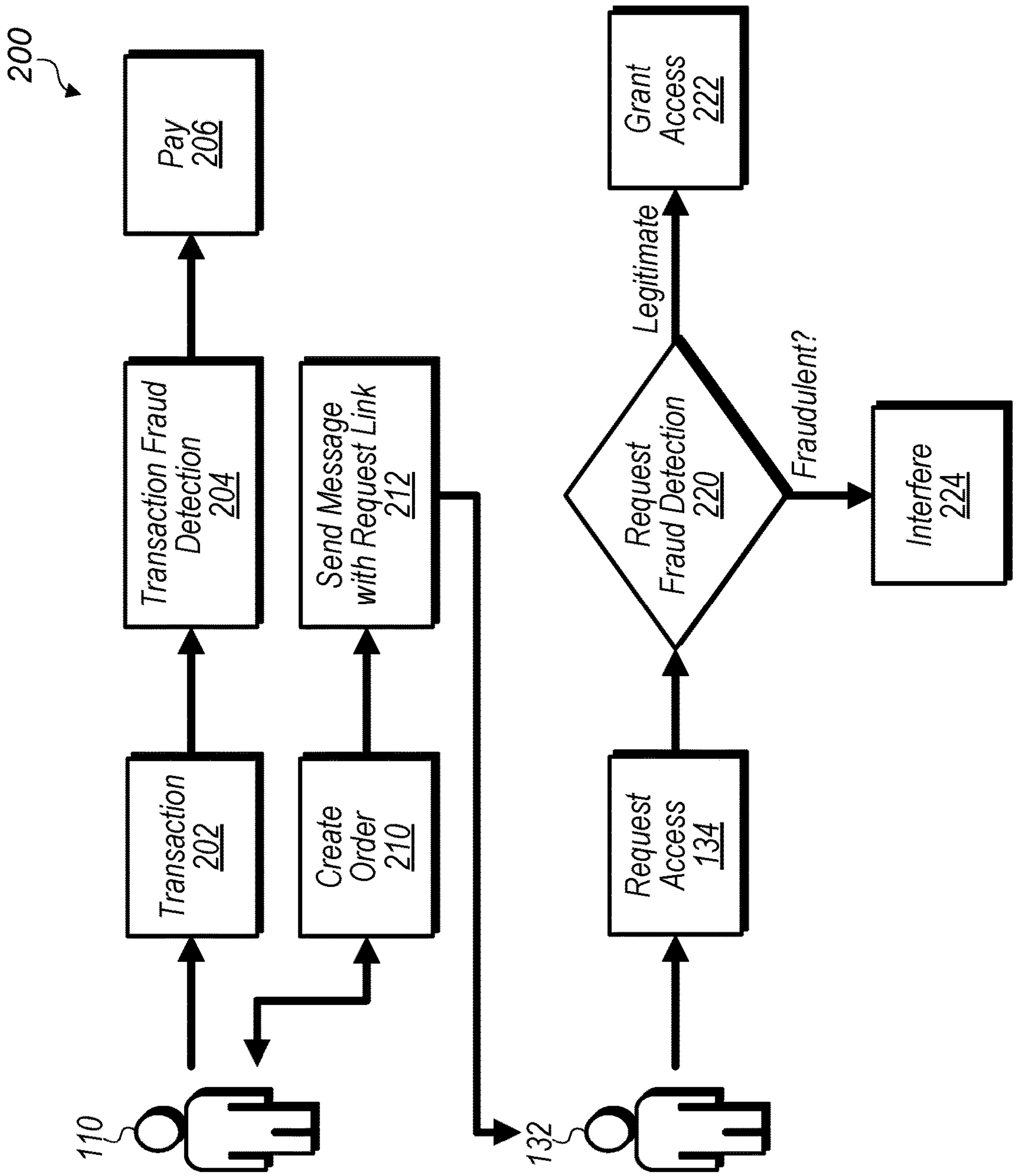
FIG. 2 is a flowchart illustrating an embodiment of an electronic resource access evaluation method in accordance with various embodiments.

Referring now to FIG. 2, a flowchart depicting an embodiment of an electronic resource access evaluation method 200 is shown. The various blocks of method 200 are performed using computer system 100. In the embodiment depicted in FIG. 2, the electronic resource 120 in question is a financial instrument such as a pre-paid debit card, a gift card, etc. It will be understood, however, that the techniques described in reference to FIG. 2 are not limited to embodiments in which the electronic resources 120 are financial instruments. As discussed herein, electronic resources could be any stored information (e.g., secure files, access to secured websites or domains) that can be linked to (i.e., by link 122) in a message and accessed by a user 132 with access to the link 122 in the message. Accordingly, blocks 210, 212, 220, 222, and 224 are applicable to embodiments in which electronic resource 120 is a financial instrument as well as embodiments in which electronic resource 120 is not a financial instrument.

At block 202, sender user 110 (or in the case of fraud, an impersonator) logs into their sender account 102 at the service provider's computer system 100 to perform a transaction (e.g., buying a digital gift card, uploading or accessing a secure file) and to specify the recipient account 130. At block 204, a separate transaction fraud detection process is used to determine whether the transaction itself appears fraudulent. In various embodiments, this transaction fraud detection process leverages fraud detection model 104 (i.e., by noting that certain sender accounts 102 may be controlled by attackers), but in other embodiments the transaction fraud detection process is independent. If the transaction is thought to be suspicious, sender user 110 is asked for further authentication in various embodiments. At block 206, computer system 100 receives payment for the order (e.g., by debiting a checking account associated with sender account 102, by charging a credit card account associated with sender account 102).

At block 210, an order (e.g., an order for a digital gift card, an order to securely store and share a secure file) is created to facilitate the sharing of link 122. At block 212, a message containing link 122 is sent to the designated recipient account 130.

In various embodiments, anyone with access to the message with link 122 (e.g., a first recipient user 132) could forward the message to someone else (e.g., a second recipient user 132) who can activate link 122 and seek access to electronic resource 120 by sending a request 134 to computer system 100. If a recipient user 132's request 134 is granted without performing a check for fraudulent activity, fraudsters might target computer system 100 (and electronic resources 120 whose access is protected by computer system 100). In embodiments where electronic resources 120 are financial instruments (e.g., gift cards to online stores), the vulnerability may be especially acute because there is no physical delivery of goods and all fraudsters would need to provide is a recipient account 130 to receive a link 122 to a gift card which can be fulfilled instantly. This gift card can then be sold on the black market for currency. Similarly, access to secure files could be sold on the black market.

In various instances, account take over (ATO) contributes to most of such fraud cases. A typical ATO scenario is as follows. Fraudsters first take over a sender user's 110 sender account 102 through various means, then use this sender account 102 to access electronic resources 120 (e.g., by buying digital gift cards, by accessing secure files) and send links 122 to such electronic resources 120 to recipient accounts 130 belonging to the attackers or their organizations. After that, the fraudsters will sell the links 122 on the black market to purchasers who in turn would access electronic resources 120 using the links 122. When the fraud is reported (e.g., sender user 110 notices that his or her account has been attacked), the service provider for computer system 100 may have to compensate sender user 110 for the fraud.

Accordingly, evaluating the request 134 using a machine learning model (e.g., fraud detection model 104) that takes into account information from various previous requests 134 to evaluate an incoming request 134 is warranted. At block 222, computer system 100 receives request 134 (e.g., from remote computer system 136) and evaluates it using a machine learning model (e.g., fraud detection model 104) designed and trained to recognize the patterns in fraudulent attempts. A particular instance of fraud detection model 104 is discussed herein in reference to FIG. 3. A training algorithm 400 useable to train fraud detection model 104 is discussed herein in reference to FIG. 4, and an interference algorithm 500 useable to evaluate an incoming request 134 with fraud detection model 104 is discussed herein in reference to FIG. 5. Another instance of fraud detection model 103 is discussed herein in reference to FIG. 4. An alternative training algorithm 1000 useable to train fraud detection model 104 is discussed herein in reference to FIG. 10, and an alternative interference algorithm 1100 useable to evaluate an incoming request 134 with fraud detection model 104 is discussed herein in reference to FIG. 11.

In instances where the evaluation indicates that the incoming request 134 is legitimate, method 200 proceeds to block 222 and request 134 to access electronic resources 120 is granted (e.g., user 132 is able to view a gift card code, user 132 is able to download a secure file, etc.). In instances where the evaluation indicates that the incoming request 134 might be fraudulent, method 200 proceeds to block 224 to interfere with access. In various embodiments (e.g., when recipient address 130 and/or requestor indicator 138 is on a black list) such interference includes a denial of request 134 and may include denying all future requests 134 associated with the user account 102 associated with the denied request 134 pending an investigation. In other instances, interference includes asking for additional verification of the identify of recipient user 132 and/or by asking sender user 110 if the request 134 is legitimate.

Referring now to FIGS. 3-14, various embodiments in which fraud detection model 104 is implemented as multipartite graph models are discussed. FIGS. 3-8 relate to embodiments in which fraud detection model 104 is implemented as a multipartite graph model that includes at least two sets of nodes. FIGS. 9-14 relate to embodiments in which fraud detection model 104 is implemented as a multipartite graph model that includes at least three sets of nodes.

Exemplary Graph Model with at Least Two Sets of Nodes

Figure 3:
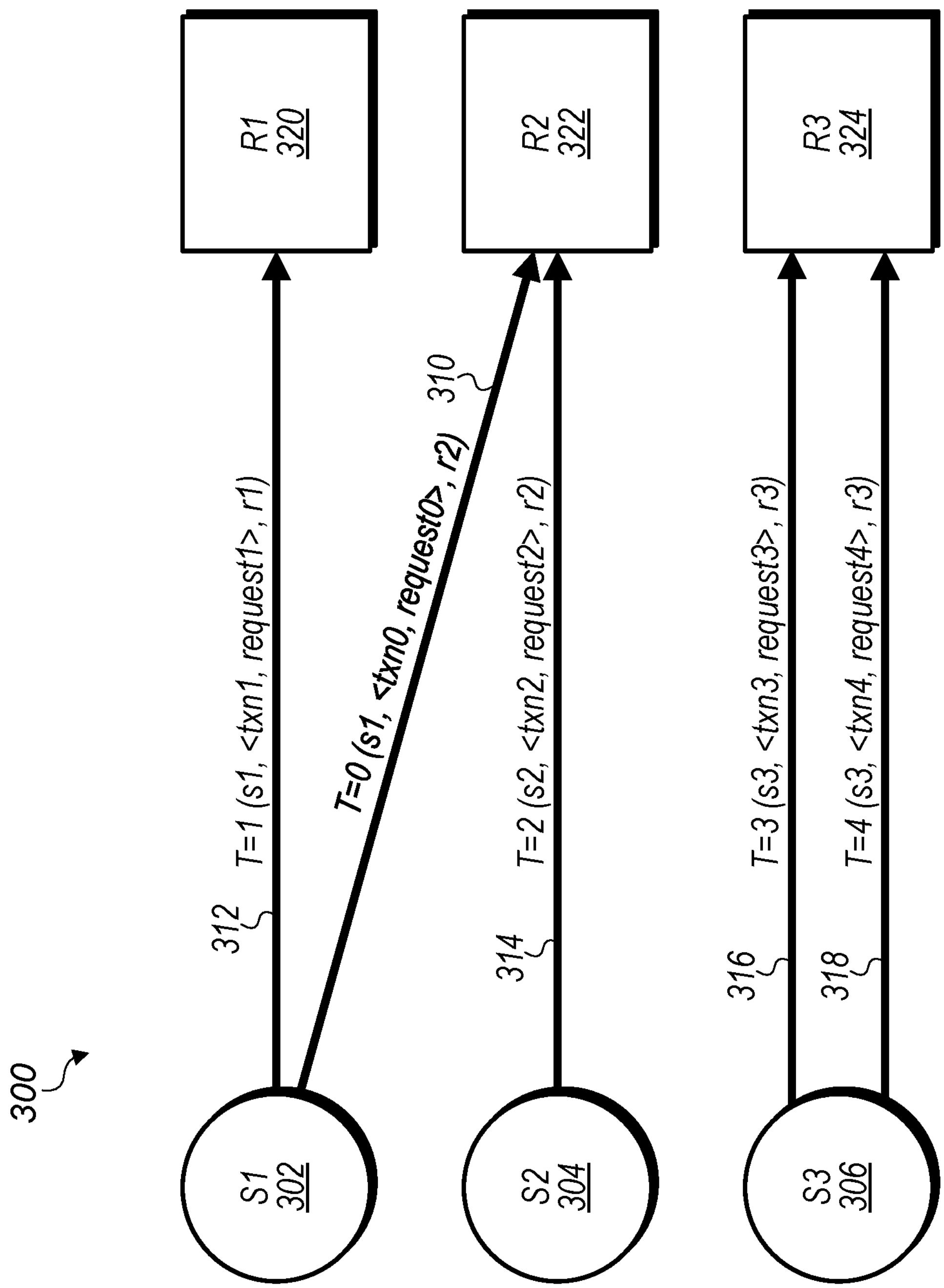
FIG. 3 is multipartite graph model in accordance with various embodiments.

Referring now to FIG. 3, a multipartite graph model 300 in accordance with various embodiments is depicted. In various embodiments, a multipartite graph embedding model like multipartite graph model 300 embodies fraud detection model 104 discussed herein. As discussed herein, multipartite graph model 300 includes various source nodes representing sender accounts 102 (e.g., Node S1 302), various target nodes representing recipient accounts 130 (e.g., Node R1 320), and edges connecting source nodes and target nodes (e.g., Edge 312 connecting Node S1 302 and Node R1 320). As discussed herein, multipartite graph model 300 is used to evaluate incoming request 134 to perform fraud detection. While the multipartite graph model 300 depicted in FIG. 3 is a bipartite graph, it will be understood that these techniques are generally applicable to multipartite graphs with more than two sets of nodes (e.g., a tripartite graph with three sets of nodes as discussed herein in reference to FIGS. 9-14).

Generally, there are two ways to do fraud detection using the multipartite graph model 300 discussed herein, either on transaction level (e.g., by request 134) or on account level (e.g., by recipient account 130). Transaction level detection classifies each transaction independently while account level detection considers all the transactions related with a specific account as a whole, usually via aggregation. The majority of existing methods detect fraud on a transaction level; however, the techniques disclosed herein also enable account level detection. In particular instances, it is useful to detect fraudsters on an email address level (e.g., individual recipient accounts 130). Intuitively, if many sender accounts 102 send links 122 to the same recipient email address, then it is more likely to be an attacker email address. The likelihood of the recipient account 130 being, for example, an attacker email address in turn helps determine whether a request 134 related to this email address is suspicious. As such, the disclosed techniques model sender accounts 102 and recipient accounts 130 as entities, and capture interaction patterns between them.

In various embodiments, this transaction network is modeled as a graph, where the sender accounts 102 and recipient accounts 130 are modelled as nodes and requests 134 between them as edges. Since new transactions are generated all the time (e.g., sender account 102 are used to generate messages containing links 122), the constructed graph is dynamically changing. Few previous graph modeling techniques deal with dynamically changing graphs, and none of them have edges that are added sequentially as problem setting. Accordingly, a novel memory-based graph embedding framework that consists of end-to-end embedding networks and classification network, that updates the embedding of associated nodes whenever a new edge comes in may be advantageous. Intuitively and statistically, if a recipient account 130 receives multiple messages with links 122 from various sender accounts 102, then it has a high chance to belong to a fraudster. Moreover, if a sender account 102 sends messages with links 122 to a number of recipient accounts, then it is likely this sender account 102 has been taken over. Therefore, past transactions and requests 134 matter. The fraud detection model 104 disclosed herein is able to make use of the sequential behaviors of transactions by memorizing them through previous node embedding values and generalize to dynamic graphs.

Referring back to the FIG. 2, a sender user 110 logs into sender account 102 and engages in a transaction (e.g., by buying a digital gift card, by uploading or accessing a secure file). In various instances, an order will be created in the backend and message containing link 122 will be sent to the specified recipient account 130. If the sender accounts 102 and recipient accounts 130 are modeled as nodes, and the requests 134 as edges, the transactions can be represented in an attributed dynamic bipartite graph. Referring again to FIG. 3, the sender accounts 102 are represented as set of source nodes S, the disjoint set of recipient accounts 130 are represented as set of target nodes R. The edges E of this bipartite graph G can represent the requests 134 and their associated transactions (e.g., the transaction to buy a digital gift card) with both of their features as edge attributes.

An attributed dynamic bipartite graph is a heterogeneous graph G=(S, R, E) where S and R are two disjoint sets of nodes, and E represents the set of edges. Each edge is of the form <source node, attribute vector, target node> (denoted as $<s, a, t>$ where $s \in S$, $r \in R$, and a represents a fixed length vector consisting of preprocessed features of attributed edges), and the contents of S, R, and E are constantly changing. For example, the edge vector below symbolizes a request 134 that is associated with a transaction performed by sender account 102 s, with r as the specified recipient account 130:

$$(s, <u_1, \ldots, u_n, v_1, \ldots, v_m>, r)$$

The attribute vector of the edge comprises of features from both the transaction and request 134. $u=<u_1, \ldots, u_n> \in \mathbb{R}^n$ an represents features of related transactions, $u_1$ could be features like quantity, total price, the particular marketplace for a digital gift card, etc. $v=<v_1, \ldots, v_m> \in \mathbb{R}^m$ represents features of the current request 134 such as requester browser session data (e.g., link 122 was activated via a particular version of web browser) or the number of times a link 122 has been activated and the time difference with respect to the last viewing (e.g., a legitimately sent link 122 is unlikely to be clicked more than once, and also unlikely to be clicked multiple times in rapid succession). In various embodiments, m and n are fixed, so that the attribute vector is of fixed length for each request 134. Note that "transactions" refer to sender account 102 (i.e., ostensibly by sender user 110 unless the sender account 102 has been compromised) action from login to payments, while request 134 refers to the activation of link 122 by recipient user 132. In various instances, transactions and requests 134 exhibit one to many relationships, since each of the links associated with one transaction can be clicked and viewed as many times as possible, and viewing itself is considered as a request 134 in this context. Therefore, there may exist multiple edges between the same sets of nodes (e.g., multiple edges between Node S3 306 and Node R3 324 in FIG. 3).

FIG. 3 shows a constructed bipartite graph of a set of hypothesized requests 134. In various embodiments, the edges and corresponding nodes are added in sequential order based on their timestamps. The first request 134 is related to txn0 that is originated by sender account 102 s1 and sent to recipient address 130 r2, and occurs time T=0. First request 134 is modeled as edge 310 between Node S1 302 and Node R2 322. As shown in FIG. 3, the transaction network includes three source nodes S1 302, S2 304, and S3 306; three target nodes R1 320, R2 322, and R3 324; and are connected by edges 310, 312, 314, 316, and 318.

Based on this FIG. 3, certain inferences can be made. For instance, recipient account 130 r2 could be an attacker email because it receives messages with links 122 from multiple sender accounts 102. Additionally, on the sender account 102 side, sender account 102 s1 could be suspicious since it sent messages with links 122 to multiple recipient accounts 130, it could have been taken over by fraudsters. Moreover, the last two requests (modeled as edges 316 and 318) could be fraudulent as well because attackers usually would check the link 122 before sending it out and hence multiple requests 134 could happen. Thus, the ability to memorize past behaviors is crucial to the fraud detection task. As discussed herein, a memory-base graph embedding technique that can remember past behaviors through previous node embedding values can improve the fraud detection task.

Referring now to FIG. 4, a training algorithm 400 for fraud detection model 104 is shown. Training algorithm 400 (and the various mathematical operations contained therein) is implemented using computer system 100 to initialize and train the fraud detection model 104 according to various embodiments in which fraud detection model 104 is implemented as a multipartite graph model with at least three populations of nodes. Algorithm 400 comprises two nested for loops in which equations 404, 406, and 408 are applied after input is received and nodes for sender accounts 102 are initialized at 402.

At 402, the training set includes a list of requests 134 $(s, <txn_{xi}, claim_{yi}, >, r)$ that is sorted by ascending timestamps. The embedding lists of senders S is randomly initialized by $\phi_{t=0}(s)\ \forall s \in S$. When a request 134 $(s, <txn_x, claim_y>, r)$ happens at time k, the embedding of sender account 102 node s associated with this request 134 is first updated using equation 404. In equation 404, $x_{data}$ is the concatenation of features $<txn_x, claim_y>$, $m<k$, $t=m$ is the last time when source node s was updated. f is an activation function such as ReLU to introduce nonlinearity, G is a sigmoid function, and g can be an activation function tanh or other normalization function to rescale output value for prevention of embedding value explosion. The updating process considers both the previous embedding value of sender s and also, for the current request 134, $txn_x$ (see discussion of $u=<u_1, \ldots, u_n>\in\mathbb{R}^n$ herein), information about the transaction related to request 134, and $claim_y$ (see discussion of $v=<v_1, \ldots, v_m>\in\mathbb{R}^m$ herein), information about the request 134 itself.

In various embodiments, for example, information about requests 134 are captured using a relatively large number of dimensions. Such information includes (but is not limited to) information such as what the underlying transaction is, the monetary value of the underlying transaction, the version of the web browser used to access link 122 in request 134, the date and time that request 134 was received, etc. As used herein, the term "embedding value" refers to a vector representing a particular sender account 102 or recipient account 130 within fraud detection model 104 using a reduced number of dimensions relative to the number of dimensions in which information about the requests 134 (and their associated transactions) are captured. In various embodiments, for example, one-hot encoding may be used to record information about request 134. This information may be represented in fraud detection model 104 using a reduced-dimension vector in which the dimensionality of the data structure is reduced using known techniques. If the node embedding dimension is too low then the accuracy of fraud detection model 104 in evaluating requests 134 is insufficient. On the other hand, when the node embedding dimension is large, more training time is required to achieve a satisfactory result.

In various embodiments, such as the multipartite graph model 300 depicted in FIG. 3, these various embedding values may represent their associated sender account 102 or recipient account 130 as nodes with edges connecting these nodes (or multiple edges such as when a particular link 122 is accessed multiple times resulting in multiple requests 134 between the same nodes or when the same sender account 102 is used to send messages with separate links 122 to the same recipient account 130).

Next, the embedding value for recipient account 130 r related to the request 134 is updated using equation 406. In equation 406, $x_{data}$ is the concatenation of features $<txn_x, claim_y>$, n<k, t=n is the last time when email node s was updated, assign $\psi_{t=n}(r)=\phi_{t=k}(s)$ if $\psi_{t=n}(r)$ does not exist. Note that x and y could be different. Similarly, the updating process takes into consideration both the previous embedding value of recipient account 130 r and current concatenated features of transaction and request 134. In addition, the updated embedding value of sender account 102 s will also be considered when updating email r. The intuition behind it is that if a sender account 102 has been taken over, then it is likely to be used for several other fraudulent transactions, and previous transactions or requests 134 could have already been reflected in the embedding value of the sender account 102 because of previous training. Therefore, the sender account 102 embedding information would be helpful in determining whether this related recipient account 130 is suspicious.

Many previous graph embedding techniques are based on unsupervised learning partly due to their inability to obtain groundtruth labels. However, in various embodiments, fraud detection model 104 has the luxury of tagging information of related transactions obtained through user filed claims or automated tagging rules engines. While such tagging is not guaranteed to be 100% accurate, these transaction tags can be leveraged to provide supervised learning in various embodiments. Groundtruth F is obtained for each request 134 using this formula:

$F((s, <txn_x, claim_y>, r))=\{1$, if $txn_x$ is fraudulent; 0, otherwise.

A typical classification loss function—cross entropy loss for recipient account 130 embedding is used as the loss function to guide the training process. For each of the requests 134 $e_i$, the loss is calculated using the embedding value of recipient account 130 and then back propagated to adjust the end-to-end embedding and classification networks using equation 408.

The reasons to train using recipient account 130 embedding value are as follows. Firstly, recipient account 130 embedding is the end result of the whole embedding process, and secondly it is most critical because the value can be used for further banning process. The parameters involved in supervised training process are $W_{data}$, $W_{prev\_sender}$, $U_{data}$, $U_{sender}$, $U_{prev\_email}$ and email classification matrix $W_{predict}$. All these parameters constitute the end-to-end embedding and classification networks. They are trained and updated whenever a request 134 comes in. Therefore, unlike unsupervised graph embedding techniques, the embedding values obtained using fraud detection model 104 are trained to be specific to the fraud detection task. Once all request 134 actions from training dataset are processed, a fixed set of model parameters as well as two embedding lists, $\phi$ for sender accounts 102 and $\psi$ for recipient accounts 130 are obtained.

Referring now to FIG. 5, an interference algorithm 500 for using fraud detection model 104 to intercept fraudulent request 134 is shown. Interference algorithm 500 (and the various mathematical operations contained therein) is implemented using computer system 100 to add nodes and edges to fraud detection model 104 as necessary and evaluate requests 134. Algorithm 500 comprises a while loop that is performed while new requests 134 are received. Algorithm 500 takes as input incoming requests 134, embedding lists $\phi$ for sender accounts 102 and $\psi$ for recipient accounts 130, and embedding networks comprising $W_{data}$, $W_{prev\_sender}$, $U_{data}$, $U_{sender}$, $U_{prev\_email}$ and email classification matrix $W_{predict}$. In the while loop, equations 502, 504, and 506 to make a determination of whether the incoming request 134 receives a fraudulent prediction 508 or a legitimate prediction 510.

The memory-based graph embedding model (e.g., fraud detection model 104) discussed herein fulfills three important tasks. Firstly, it is able to utilize past transaction and request 134 information by its memory mechanism though previous embedding values of the nodes (e.g., nodes 302, 304, 306, 320, 322, 324). Secondly, it has the ability to handle graphs with multiple edges. Third, fraud detection model 104 is able to accommodate dynamically changing graphs and naturally generalize to unseen nodes. After fraud detection model 104 is trained, embedding lists $\phi$ for sender accounts 102 and $\psi$ for recipient accounts 130 are obtained. The timestamp can then be reset and apply these lists as embedding values at t=0. Then equations 502 and 504 can be used to evaluate new requests 134 by adding nodes and edges as necessary and updating embedding values for both existing and new nodes. Equation 502 corresponds to equation 404 and equation 504 corresponds to equation 406 discussed in connection to FIG. 4. In this way, fraud detection model 104 uses end-to-end embedding and classification to fine tune itself as new requests 134 come in.

Equation 506 produces a final output value of fraud detection model 104 for an incoming request 134 that is used to determine whether the incoming request 134 is fraudulent or legitimate. In various embodiments, this final output value is a prediction score for the likelihood that a particular recipient account 130 is (or is an associate of) an attacker. This prediction score is used in determining whether to grant incoming request 134. If the recipient accounts 130 behaves like an attacker, (i.e. the output value of equation 506 is close to 1 or above a certain threshold), then this request 134 will be classified as fraudulent (fraudulent prediction 508), and guided through an additional authentication flow again, or in embodiments outright denied. If the output value of equation 506 is close to 0 or below the threshold, the request 134 will be classified as legitimate and granted (although the request 134 is subject to reclassification as additional requests 134 come in as discussed herein). As discussed herein, if the recipient accounts 130 has an embedding value above a black list threshold, this recipient account 130 may be added to a black list. In various embodiments, being on the black list ensures that all request 134 sent to that recipient account 130 are denied and sender accounts 102 that have sent messages containing links 122 to that recipient account 130 are investigated. Thus, fraud detection model 104 provides account level detection.

Thus, in various embodiments, when an incoming request 134 is received and evaluated using fraud detection model 104, the evaluating includes generating updated embedding values for the sender account 102 and recipient account 130 that are associated with the request 134 (and related transaction). In various embodiments, the updated embedding value for the sender account 102 is based on the request 134 as well as the previous embedding value for that particular sender account 102 (or an initialized embedding value for that sender account 102 if the request 134 is the first associated with that sender account 102). In various embodiments, the updated embedding value for the recipient account 130 is based on the request 134, the updated embedding value for the sender account 102, and the previous embedding value for that particular recipient account 130 (or an initialized embedding value for that recipient account 130 if the request 134 is the first associated with that recipient account 130). These updated embedding value both continue to tune fraud detection model 104 and are useable by fraud detection model 104 to predict whether a particular recipient account 130 is suspected of fraud. In various other embodiments, fraud detection model 104 can additionally or alternatively use the updated embedding value for a particular sender account 102 to predict whether that particular sender account 102 has been compromised. Moreover, because fraud detection model 104 is automatically adjusted by incorporating updated embedding values as requests 134 come in, when a second incoming request 134 is received, the second incoming request 134 is evaluated using the automatically adjusted fraud detection model 104 (and fraud detection model 104 is also automatically adjusted to reflect changes from the second incoming request 134).

In testing, embodiments of fraud detection model 104 achieved a more than 20% increase in recall at fixed precision as compared to baseline models. A dataset of requests 134 was tested against other techniques such as XGBoost with Synthetic Minority Over-sampling Technique (SMOTE), Support Vector Machine with SMOTE, Random Forests with SMOTE, and Multi-layer Perceptron Networks to determine a baseline. The following equations were used to define precision and recall in the tests of embodiments of fraud detection model 104 against baseline techniques:

Precision=(true positive)/(true positive+false positive)

Recall=(true positive)/(true positive+negative)

Thus, recall is the catch rate of fraudulent requests 134. Although precision and recall are both preferred to be high, they are essentially a trade-off between catch rate and user experience. In various instances, as much as a high catch rate is desired, a service provider might not want to sacrifice user experience by guiding too many legitimate users (e.g., sender user 110, recipient users 132) for additional authentication. In order to balance catch rate and user experience, in various instances, a service provider might set a criterion for true positive vs false positive to be less than 1:2, which translates into precision to be above 33%. This means for each of the true fraudulent actions a model catches, the service provider determines to tolerate two false positives. In such an instance, therefore, a goal is to maximize recall at 33% precision.

Embodiments of fraud detection model 104 discussed herein were able to achieve >50% recall, which surpassed all of the baseline models by 20% or more. Moreover, not only at 33% precision, embodiments of fraud detection model 104 outperformed the baseline models in terms of catch rate at all precision levels.

Because groundtruth may be noisy (e.g., not all fraud is discovered, there may be mistakes in reporting particular requests 134 as fraudulent), model robustness against noisy groundtruth is also important. It was determined, though, that while the performance of fraud detection model 104 worsened with increased levels of groundtruth noise, embodiments of fraud detection model 104 demonstrated better catch rate at 33% precision compared to all baseline models even with noisy groundtruth.

Figure 6:
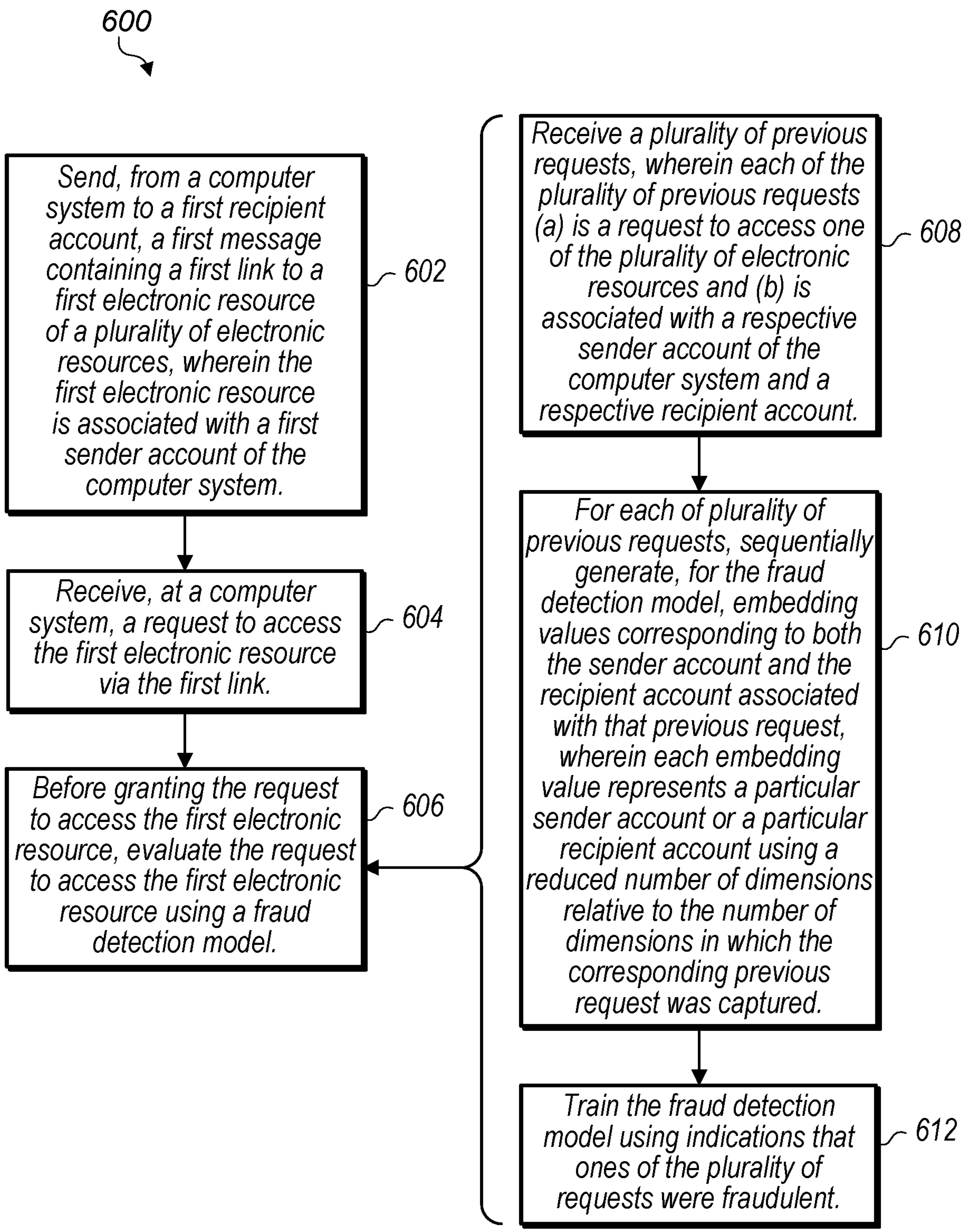
FIG. 6 is a flowchart illustrating an embodiment of an evaluation method in accordance with various embodiments.
Figure 7:
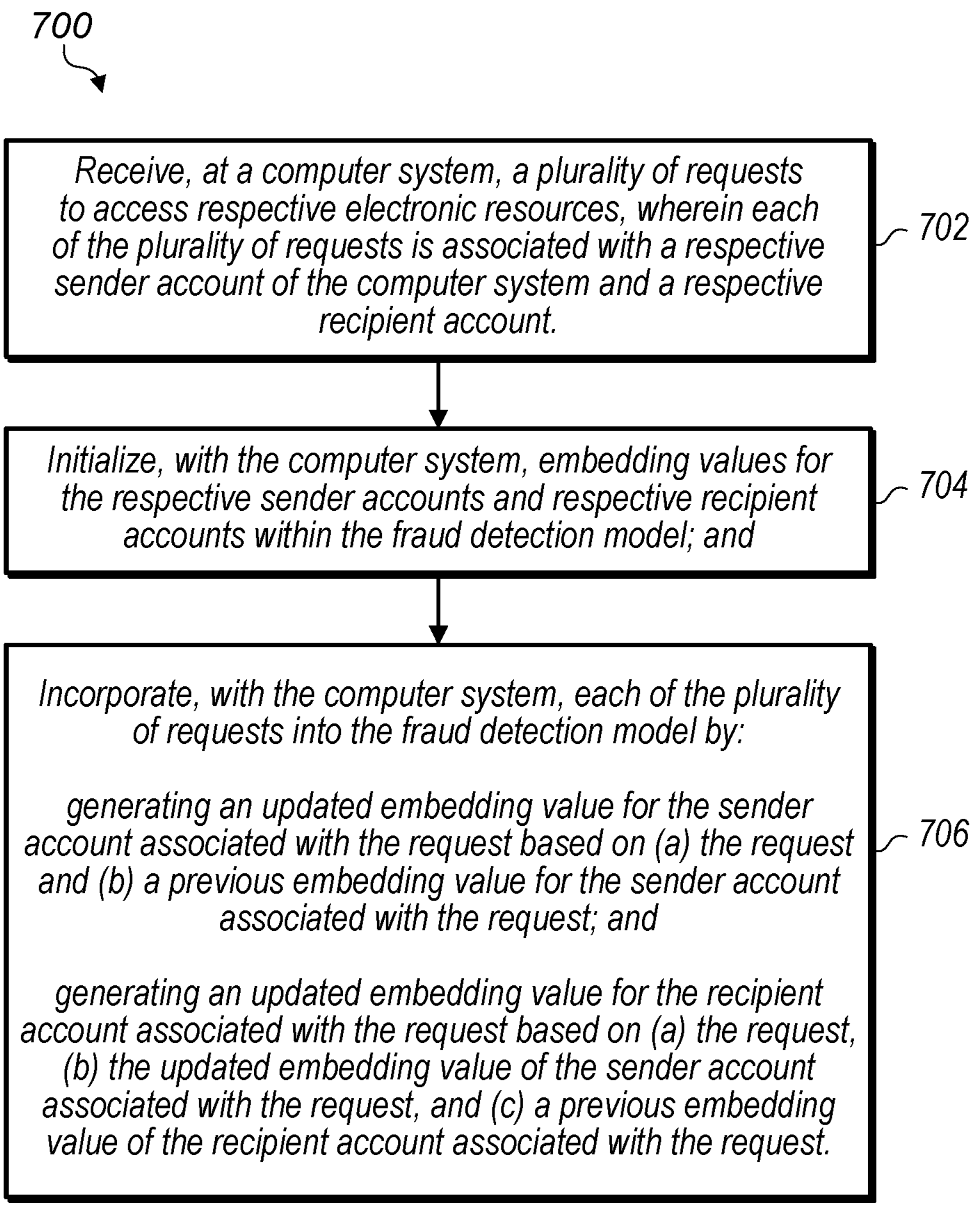
FIG. 7 is a flowchart illustrating an embodiment of a training method in accordance with various embodiments.
Figure 8:
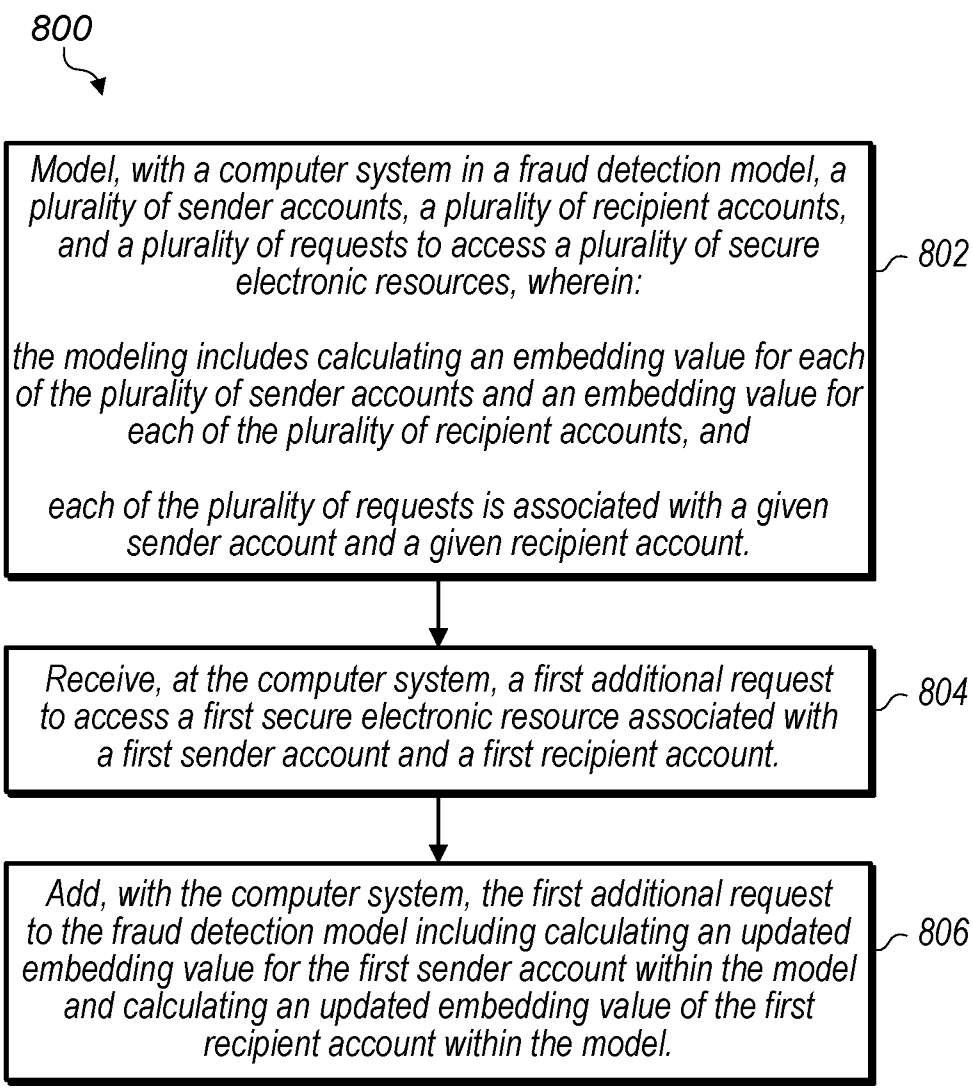
FIG. 8 is a flowchart illustrating an embodiment of an updating method in accordance with various embodiments.

FIGS. 6, 7, and 8 illustrate various flowcharts representing various disclosed methods implemented with the components depicted in FIG. 1. Referring now to FIG. 6, a flowchart depicting an evaluation method 600 for a request 134 is depicted. In the embodiment shown in FIG. 6, the various actions associated with method 600 are implemented by computer system 100. In various embodiments, computer system 100 uses training algorithm 400 and interference algorithm 500 discussed herein in performing method 600.

At block 602, computer system 100 sends to a first recipient account 130, a first message containing a first link 122 to a first electronic resource 120 of a plurality of electronic resources 120. Each of the first electronic resources 120 is associated with a first sender account 102 of computer system 100. At block 604, computer system 100 receives a request 134 to access the first electronic resource 120 via the first link 122. At block 606, before granting the request 134 to access the first electronic resource 120, computer system 100 evaluates the request 134 to access the first electronic resource 120 using a fraud detection model 104.

Blocks 608, 610, and 612 describe various actions used to generate fraud detection model 104. At block 608, computer system 100 receives a plurality of previous requests 134, wherein each of the plurality of previous requests 134 (a) is a request 134 to access one of the plurality of electronic resources 120 and (b) is associated with a respective sender account 102 of the computer system 100 and a respective recipient account 130. At block 610, computer system 100 sequentially generates, for each of plurality of previous requests 134, embedding values corresponding to both the sender account 102 and the recipient account 130 associated with that previous request 134, wherein each embedding value represents a particular sender account 102 or a particular recipient account 130 using a reduced number of dimensions relative to the number of dimensions in which the corresponding previous request 134 was captured. At block 612, computer system 100 trains fraud detection model 104 using indications that ones of the plurality of requests 134 were fraudulent.

Referring now to FIG. 7, a flowchart depicting a training method 700 for model 104 is depicted. In the embodiment shown in FIG. 7, the various actions associated with method 700 are implemented by computer system 100. In various embodiments, computer system 100 uses training algorithm 400 discussed herein in performing method 700.

At block 702, computer system 100 receives a plurality of requests 134 to access respective electronic resources 120. Each of the plurality of requests 134 is associated with a respective sender account 102 of computer system 100 and a respective recipient account 130. At block 704, computer system 100 initializes embedding values for the respective sender accounts 102 and respective recipient accounts 130 within fraud detection model 104. At block 706, computer system 100 incorporates each of the plurality of requests 134 into fraud detection model 104 by generating an updated embedding value for the sender account 102 associated with request 134 based on (a) the particular request 134 and (b) a previous embedding value for the sender account 102 associated with the particular request 134; and generating an updated embedding value for the recipient account 130 associated with the particular request 134 based on (a) the particular request 134, (b) the updated embedding value of the sender account 102 associated with the particular request 134, and (c) a previous embedding value of the recipient account 130 associated with the particular request 134.

Referring now to FIG. 8, a flowchart depicting an updating method 800 for model 104 is depicted. In the embodiment shown in FIG. 8, the various actions associated with method 800 are implemented by computer system 100. In various embodiments, computer system 100 uses training algorithm 400 and interference algorithm 500 discussed herein in performing method 800.

At block 802, computer system 100 models, in a fraud detection model 104, a plurality of sender accounts 102, a plurality of recipient accounts 130, and a plurality of requests 134 to access a plurality of secure electronic resources 120. The modeling includes calculating an embedding value for each of the plurality of sender accounts 102 and an embedding value for each of the plurality of recipient accounts 130. Each of the plurality of requests 134 is associated with a given sender account 102 and a given recipient account 130. At block 804, computer system 100 receives a first additional request 134 to access a first secure electronic resource 120 associated with a first sender account 102 and a first recipient account 130. At block 806, computer system 100 adds the first additional request 134 to the fraud detection model 104 including calculating an updated embedding value for the first sender account 102 within the fraud detection model 104 and calculating an updated embedding value of the first recipient account 130 within the fraud detection model 104.

Exemplary Graph Model with at Least Three Sets of Nodes

Figure 9:
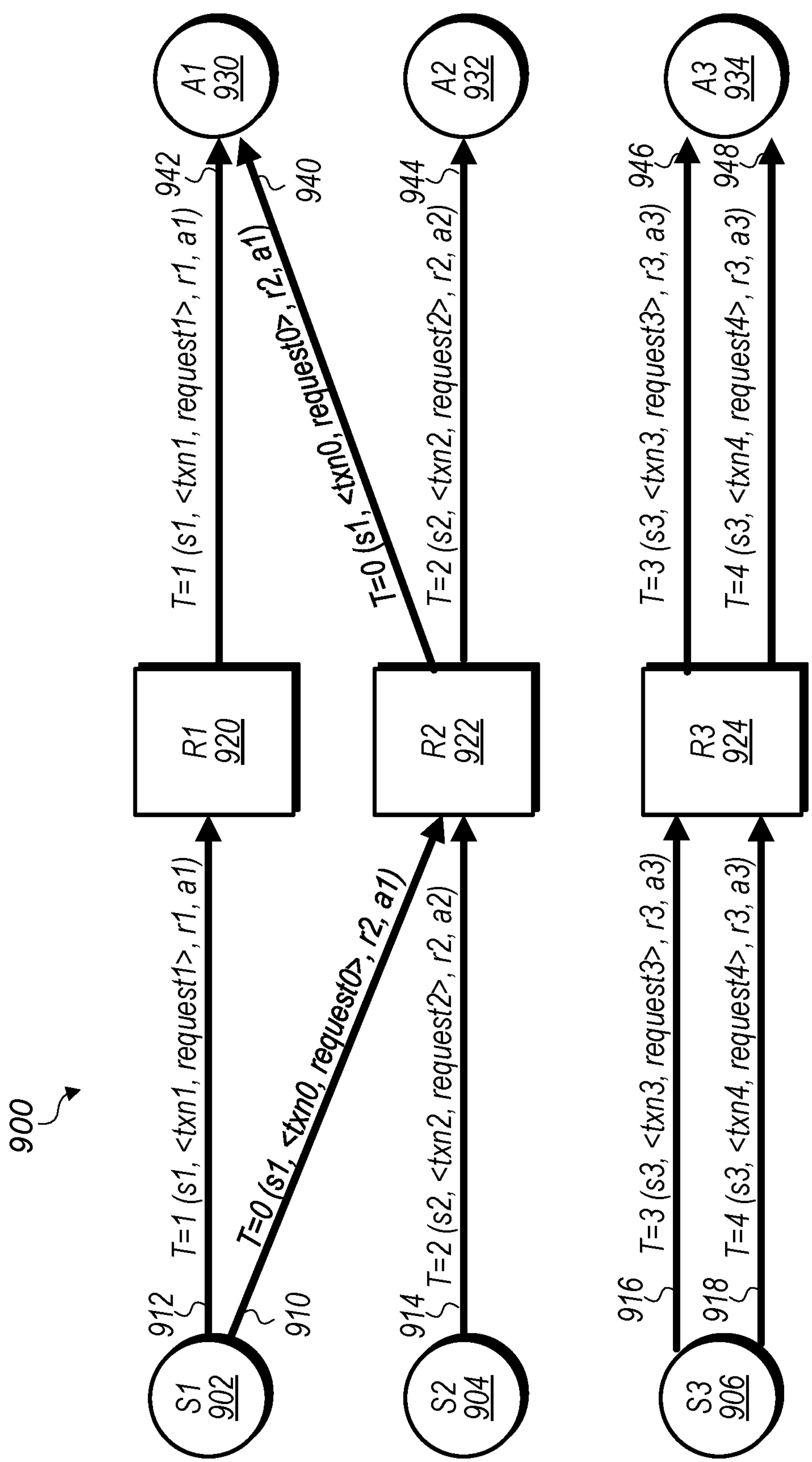
FIG. 9 is another multipartite graph model in accordance with various embodiments.

Referring now to FIG. 9 a multipartite graph model 900 in accordance with various embodiments is depicted. In various embodiments, a multipartite graph embedding model like multipartite graph model 900 embodies fraud detection model 104 discussed herein. As discussed herein, multipartite graph model 900 includes various source nodes representing sender accounts 102 (e.g., Node S1 902), various target nodes representing recipient accounts 130 (e.g., Node R1 920), various requestor indicator nodes representing requestor indictors 138 associated with remote computer systems 136 from which requests 134 were sent (e.g., Node I1 930), edges connecting source nodes and target nodes (e.g., Edge 912 connecting Node S1 902 and Node R1 920), and edges connecting requestor indicator nodes and target nodes (e.g., Edge 942 connecting Node I1 930 and Node R1 920). As discussed herein, multipartite graph model 900 is used to evaluate incoming request 134 to perform fraud detection. While the multipartite graph model 300 depicted in FIG. 9 is a tripartite graph, it will be understood that these techniques are generally applicable to multipartite graphs with more than three sets of nodes (e.g., a multipartite graph with four, five, or more sets of nodes).

In various embodiments, multipartite graph model 900 may be used to detect fraud on a transaction level (e.g., by request 134), on an account level (e.g., by recipient account 130), and/or on a requestor indicator level (e.g., by one or more requestor indicators 138 associated with remote computers 136). Transaction level detection classifies each transaction independently while account level and requestor indicator level detection consider all the transactions related with a specific account and/or requestor indicator as a whole, usually via aggregation. In addition to enabling transaction level detection, the techniques disclosed herein also enable account level detection and requestor indicator level detection. In particular instances, for example, it is useful to detect fraudsters on an email address level (e.g., individual recipient accounts 130) or on an IP address level (e.g., by the IP address of various remote computer systems 136). Intuitively, if many sender accounts 102 send links 122 to the same recipient email address, then it is more likely to be an attacker email address. The likelihood of the recipient account 130 being an attacker email address in turn helps determine whether a request 134 related to this email address is suspicious. Moreover, if the same IP address is used to make requests 134 associated with different sender accounts 102 and/or different recipient accounts 130, then it is more likely to be an attacker remote computer system. As such, the disclosed techniques model sender accounts 102, recipient accounts 130, and requestor indicators 138 as entities, and capture interaction patterns between them.

In various embodiments, this transaction network is modeled as a graph, where the sender accounts 102, recipient accounts 130, and requestor indictors are modelled as nodes and requests 134 between them as edges. Since new transactions are generated all the time (e.g., sender account 102 are used to generate messages containing links 122), the constructed graph is dynamically changing. Accordingly, the graph embedding framework discussed herein consists of end-to-end embedding and classification networks, that updates the embedding of associated nodes whenever a new edge comes in. Intuitively and statistically, if a recipient accounts 130 receives multiple messages with links 122 from various sender accounts 102, then it has a high chance to belong to a fraudster. Similarly, if a requestor indicator is used to make multiple requests 134 that are associated with various recipient accounts 130 and/or sender accounts 102, then there is a high chance that the remote computer system 136 associated with the requestor indicator belongs to a fraudster. Moreover, if a sender account 102 sends messages with links 122 to a number of recipient accounts 130, then it is likely this sender account 102 has been taken over. Therefore, past transactions and requests 134 matter. The fraud detection model 104 disclosed herein is able to make use of the sequential behaviors of transactions by memorizing them through previous node embedding values and generalize to dynamic graphs.

Referring back to the FIG. 2, a sender user 110 logs into sender account 102 and engages in a transaction (e.g., by buying a digital gift card, by uploading or accessing a secure file). In various instances, an order will be created in the backend and message containing link 122 will be sent to the specified recipient account 130. As discussed herein, a request 134 to access the subject of the transaction (e.g., a request to redeem a digital gift card, a request to access a secure file) is then received from remote computer system 136 associated with a requestor indicator. If the sender accounts 102, recipient accounts 130, and requestor indicators 138 are modeled as nodes, and the requests 134 as edges, the transactions can be represented in an attributed dynamic multipartite graph. Referring again to FIG. 9, the sender accounts 102 are represented as set of source nodes S, the disjoint set of recipient accounts 130 are represented as set of target nodes R, and the disjoint set of requestor indicators 138 are represented as a set of indicator nodes I. The edges E of this tripartite graph G can represent the requests 134 and their associated transactions (e.g., the transaction to buy a digital gift card) with all three features as edge attributes.

An attributed dynamic tripartite graph is a heterogeneous graph G=(S, R, I, E) where S, R, and A are three disjoint sets of nodes, and E represents the set of edges. Each edge is of the form <source node, attribute vector, target node, requestor indicator node> (denoted as $<s, a, t, i>$ where $s \in S$, $r \in R$, $i \in I$, and a represents a fixed length vector consisting of preprocessed features of attributed edges), and the contents of S, R, I, and E are constantly changing. For example, the edge vector below symbolizes a request 134 that is associated with a transaction performed by sender account 102 s, with r as the specified recipient account 130, and i as the requester identifier associated with the remote computer system 136 associated with request 134:

$$(s, <u_1, \ldots, u_n, v_1, \ldots, v_m>, r, i)$$

The attribute vector of the edge comprises of features from both the transaction and request 134. $u = <u_1, \ldots, u_n> \in \mathbb{R}^n$ represents features of related transactions, $u_1$ could be features like quantity, total price, the particular marketplace for a digital gift card a file data type, location, or other metadata about the secure electronic resource 120 that is the subject of request 134, etc. $v = <v_1, \ldots, v_m> \in \mathbb{R}^m$ represents features of the current request 134 such as requester browser session data (e.g., link 122 was activated via a particular version of web browser) or the number of times a link 122 has been activated and the time difference with respect to the last viewing (e.g., a legitimately sent link 122 is unlikely to be clicked more than once, and also unlikely to be clicked multiple times in rapid succession). In various embodiments, m and n are fixed, so that the attribute vector is of fixed length for each request 134. Note that "transactions" refer to sender account 102 (i.e., ostensibly by sender user 110 unless the sender account 102 has been compromised) action from login to payments, while request 134 refers to the activation of link 122 by recipient user 132. In various instances, transactions and requests 134 exhibit one to many relationships, since each of the links associated with one transaction can be clicked and viewed as many times as possible, and viewing itself is considered as a request 134 in this context. Therefore, there may exist multiple edges between same sets of nodes (e.g., multiple edges between Node S3 906 and Node R3 924 in FIG. 9). Additionally, in the embodiment shown in FIG. 9, each request 134 is represented as two edges in multipartite graph model 900: a first edge between the appropriate source node and target node and a second edge between the appropriate requestor indicator node and target node (e.g., edge 912 between Node S1 902 and Node R1 920 and edge 942 between Node I1 930 and Node R1 920 both represent the same request 134).

FIG. 9 shows a constructed tripartite graph of a set of hypothesized requests 134. In various embodiments, the edges and corresponding nodes are added in sequential order based on their timestamps. The first request 134 is related to txn0 that is originated by sender account 102 s1 and sent to recipient address 130 r2, and occurs time T=0. Thus, the first request 134 is modeled as edge 910 between Node S1 902 and Node R2 922. As shown in FIG. 9, the transaction network includes three source nodes S1 902, S2 904, and S3 906; three target nodes R1 920, R2 922, and R3 924; three requestor indicator nodes I1 930, I2 932, and I3 934, and are connected by edges 910, 912, 914, 916, 918, 940, 942, 944, 946, and 948.

Based on this FIG. 9, certain inferences can be made. For instance, recipient account 130 r2 could be an attacker email because it receives messages with links 122 from multiple sender accounts 102 (i.e., s1 and s2) and because requests 134 associated with recipient account 130 r2 are associated with two different request indicators (i.e., i1 and i2). Additionally, on the sender account 102 side, sender account 102 s1 could be suspicious since it sent messages with links 122 to multiple recipient accounts 130, it could have been taken over by fraudsters. Moreover, the last two requests (modeled as edges 316 and 318) could be fraudulent as well because attackers usually would check the link 122 before sending it out and hence multiple requests 134 could happen. The, the ability to memorize past behaviors is crucial to the fraud detection task. As discussed herein, a memory-base graph embedding technique that can remember past behaviors through previous node embedding values can improve the fraud detection task.

In the embodiment shown in FIG. 9, the multipartite graph model 900 that embodies fraud detection model 104 includes three sets of nodes representing sender account 102, recipient accounts 130, and requestor indicators 138, respectively. In various embodiments, however, other aspects of request 134 may be represented in fraud detection model 104 as additional sets of nodes. For example, in various embodiments, such additional sets of nodes include intermediary indicators (i.e., one or more internet protocol (IP) addresses, one or more media access control (MAC) addresses, one or more manufacturer's serial numbers, or other unique identifiers of computer systems such as proxy servers, internet service provider servers, routers, etc. that constitute the transmission network pathway between remote computer system 136 and computer system 100)

Referring now to FIG. 10, a training algorithm 1000 for embodiments of fraud detection model 104 is shown. Training algorithm 400 (and the various mathematical operations contained therein) is implemented using computer system 100 to initialize and train fraud detection model 104 according to various embodiments in which fraud detection model 104 is implemented as a multipartite graph model with at least three populations of nodes. Algorithm 1000 comprises two nested for loops in which equations 1004, 1006, 1008, and 1010 are applied after input is received and nodes for sender accounts 102 are initialized at 1002.

At 1002, the training set includes a list of requests 134 $e_i$: $(s, <txn_{xi}, claim_{yi};>, r, c)$ that is sorted by ascending timestamps. The embedding lists of senders S is randomly initialized by $\phi_{t=0}(s)\ \forall s \in S$. When a request 134 $(s, <txn_x,$ $claim_y>$, r, c) happens at time k, the embedding value $\phi_{t=k}k(s)$ of sender account 102 node s associated with this request 134 is first updated using equation 1004. In equations 1004, 1006, 1008, and 1010 discussed below, $x_{data}$ is the concatenation of features $<txn_x, claim_y>$, $m<k$, $t=m$ is the last time when source node s was updated, $n<k$, $t=n$ is the last time when receiver node r was updated, $1<k$, $t=1$ is the last time when requestor indicator i node was updated, f is an activation function such as ReLU to introduce nonlinearity, a is a sigmoid function, and g can be an activation function tanh or other normalization function to rescale output value for prevention of embedding value explosion. The updating process considers both the previous embedding value of sender s and also, for the current request 134, $txn_x$ (see discussion of $u=<u_1, \ldots, u_n>\in\mathbb{R}^n$ herein), information about the transaction related to request 134, and $claim_y$ (see discussion of $v=<v_1, \ldots, v_m>\in\mathbb{R}^m$ herein), information about the request 134 itself.

In various embodiments, for example, information about requests 134 is captured using a relatively large number of dimensions. Such information includes (but is not limited to) information such as what the underlying transaction is, the monetary value of the underlying transaction, the version of the web browser used to access link 122 in request 134, the date and time that request 134 was received, etc. As used herein, the term "embedding value" refers to a vector representing a particular sender account 102, recipient account 130, or requestor indicator associated with a remote computer system 136 within fraud detection model 104 using a reduced number of dimensions relative to the number of dimensions in which information about the requests 134 (and their associated transactions) are captured. In various embodiments, for example, one-hot encoding may be used to record information about request 134. This information may be represented in fraud detection model 104 using a reduced-dimension vector in which the dimensionality of the data structure is reduced using known techniques. If the node embedding dimension is too low, then the accuracy of fraud detection model 104 in evaluating requests 134 is insufficient. On the other hand, when the node embedding dimension is large, more training time is required to achieve a satisfactory result.

In various embodiments, such as the multipartite graph model 900 depicted in FIG. 9, these various embedding values may represent their associated sender account 102, recipient account 130, and requestor indicators 138 as nodes with edges connecting these nodes (or multiple edges such as when a particular link 122 is accessed multiple times resulting in multiple requests 134 between the same nodes or when the same sender account 102 is used to send messages with separate links 122 to the same recipient account 130).

Next, the embedding value $\psi_{t=k}(r)$ for recipient account 130 r related to the request 134 is updated using equation 1006. In equation 1006, $x_{data}$ is the concatenation of features $<txn_x, claim_y>$, $n<k$, $t=n$ is the last time when email node s was updated. If $\psi_{t=n}(r)$ does not exist, then assign $\psi_{t=n}(r)=\phi_{t=k}(s)$. Note that x and y could be different. Similarly, the updating process takes into consideration both the previous embedding value of recipient account 130 r and current concatenated features of transaction and request 134. In addition, the updated embedding value of sender account 102 s will also be considered when updating target node r. The intuition behind it is that if a sender account 102 has been taken over, then it is likely to be used for several other fraudulent transactions, and previous transactions or requests 134 could have already been reflected in the embedding value of the sender account 102 because of previous training. Therefore, the sender account 102 embedding information would be helpful in determining whether this related recipient account 130 is suspicious.

Similarly, the embedding value $\theta_{t=k}(c)$ for requestor indicator 138 i related to the request 134 is updated using equation 1008. As discussed above in equation 1008, $x_{data}$ is the concatenation of features $<txn_x, claim_y>$, $m<k$, $t=m$ is the last time when source node s was updated, $n<k$, $t=n$ is the last time when receiver node r was updated, $1<k$, $t=1$ is the last time when requestor indicator i node was updated. If $\theta_{t=k}(c)$ does not exist, then assign $\theta_{t=k}(c)=\psi_{t=k}(r)$. Note again that x and y could be different (e.g., in instances where there are more requests 134 than transactions because two or more requests 134 has been made for some of the underlying transactions as discussed herein). Here, the updating process takes into consideration both the previous embedding value of requestor indicator 138 i and current concatenated features of transaction and request 134. In addition, the updated embedding values of sender account 102 s and recipient account 130 r will also be considered when updating requestor indicator 138 i. The intuition behind it is that if a particular sender account 102 has been taken over and/or a particular recipient account 130 is controlled by a fraudster, then a remote computer system 136 associated with requests 134 associated with these particular sender and recipient accounts 102, 130 is likely to be used for several other fraudulent transactions. Accordingly, previous transactions or requests 134 could have already been reflected in the embedding value of the sender account 102 and recipient account 130 because of previous training. Therefore, the sender account 102 and recipient account 130 embedding information would be helpful in determining whether this related requestor indicator is suspicious.

Many previous graph embedding techniques are based on unsupervised learning partly due to their inability to obtain groundtruth labels. However, in various embodiments, fraud detection model 104 has the luxury of tagging information of related transactions obtained through user filed claims or automated tagging rules engines. While such tagging is not guaranteed to be 100% accurate, these transaction tags can be leveraged to provide supervised learning in various embodiments. Groundtruth F is obtained for each request 134 using this formula:

$F((s, <txn_x, claim_y>, r, i))=\{1$, if $txn_x$ is fraudulent; 0, otherwise.

A typical classification loss function—cross entropy loss for recipient account 130 embedding is used as the loss function to guide the training process. For each of the request 134 $e_1$, the loss is calculated using the embedding value of recipient account 130 and then back propagated to adjust the end-to-end embedding and classification networks using equation 1010.

The reasons to train using the requestor indicator embedding value $\theta_{t=k}(c)$ are as follows. Firstly, the requestor indicator embedding value $\theta_{t=k}(c)$ is the end result of the whole embedding process of training algorithm 1000, and secondly it important because the value can be used for a further banning process (e.g., banning a particular requestor indicator 138 from making requests 134). The parameters involved in supervised training process are $W_{data}$, $W_{prev\_sender}$, $U_{data}$, $U_{sender}$, $U_{prev\_email}$, $V_{data}$, $V_{sender}$, $V_{email}$, $V_{pre\_ip}$ and email classification matrix $W_{predict}$. Note that the subscripts relating to "sender," "email," and "ip" merely refer to sender accounts 102, recipient accounts 130, and requestor indicators 138 as discussed herein, but the techniques discussed herein are not limited to emails and IP addresses. All these parameters constitute the end-to-end embedding and classification networks. They are trained and updated whenever a request 134 comes in. Therefore, unlike unsupervised graph embedding techniques, the embedding values obtained using fraud detection model 104 are trained to be specific to the fraud detection task. Once all request 134 actions from the training dataset are processed, a fixed set of model parameters as well as three embedding lists, $\phi$ for sender accounts 102, $\psi$ for recipient accounts 130, and $\theta$ for requestor indicators 138 are obtained.

Referring now to FIG. 11, an interference algorithm 1100 for using fraud detection model 104 to intercept fraudulent request 134 is shown. Interference algorithm 1100 (and the various mathematical operations contained therein) is implemented using computer system 100 to add nodes and edges to fraud detection model 104 as necessary and evaluate requests 134. Algorithm 1100 comprises a while loop that is performed while new requests 134 are received. Algorithm 1100 takes as input incoming requests 134, embedding lists $\phi$ for sender accounts 102, w for recipient accounts 130, 0 for requestor indicators 138, and embedding networks comprising $W_{data}$, $W_{prev\_sender}$, $U_{data}$, $U_{sender}$, $U_{prev\_email}$, $V_{data}$, $V_{sender}$, $V_{email}$, $V_{pre\_ip}$ and email classification matrix $W_{predict}$. In the while loop, equations 1102, 1104, 1106, and 1108 to make a determination of whether the incoming request 134 receives a fraudulent prediction 1110 or a legitimate prediction 1112.

The memory-based graph embedding model (e.g., fraud detection model 104) with three populations of nodes discussed herein fulfills three important tasks. Firstly, it is able to utilize past transaction and request 134 information by its memory mechanism though previous embedding values of the nodes (e.g., nodes 902, 904, 906, 920, 922, 924, 930, 932, 934). Secondly, it has the ability to handle graphs with multiple edges. Third, fraud detection model 104 is able to accommodate dynamically changing graphs and naturally generalize to unseen nodes. After fraud detection model 104 is trained, embedding lists $\phi$ for sender accounts 102, $\psi$ for recipient accounts 130, and 0 for requestor indicators 138 are obtained. The timestamp can then be reset and apply these lists as embedding values at t=0. Then equations 1102, 1104, and 1106 can be used to evaluate new requests 134 by adding nodes and edges as necessary and updating embedding values for both existing and new nodes. Equation 1102 corresponds to equation 1004, equation 1104 corresponds to equation 1006, and equation 1106 corresponds to equation 1008 discussed in connection to FIG. 10. In this way, fraud detection model 104 uses end-to-end embedding and classification to fine tune itself as new requests 134 come in.

Equation 1108 produces a final output value of an embodiment of fraud detection model 104 for an incoming request 134 that is used to determine whether the incoming request 134 is fraudulent or legitimate according to various embodiments. In various embodiments, this final output value is a prediction score for the likelihood that a particular requestor indicator 138 is controlled by (or is otherwise associated with) an attacker. This prediction score is used in determining whether to grant incoming request 134. If the requestor indicator 138 behaves like an attacker, (i.e. the output value of equation 1108 is close to 1 or above a certain threshold), then this request 134 will be classified as fraudulent (fraudulent prediction 1110), and guided through an addition authentication flow again, or in embodiments outright denied. If the output value of equation 1108 is close to 0 or below the threshold, the request 134 will be classified as legitimate and granted (although the request 134 is subject to reclassification as additional request 134 come in as discussed herein). This prediction score can also be used in determining whether to grant incoming request 134.

As discussed herein, if the requestor indicator 138 has an embedding value above a black list threshold, this requestor indicator 138 may be added to a black list. In various embodiments, being on the black list ensures that all requests 134 associated with that requestor indicator 138 (e.g., a request 134 sent from a particular remote computer system 136 associated with the particular requestor indicator 138) are denied and (a) sender accounts 102 that have sent messages containing links 122 associated with requests 134 associated with that requestor indicator 138 and/or (b) recipient accounts 130 that have received message containing links 122 associated with requests 134 associated with that requestor indicator 138 are investigated. Moreover, should such investigations reveal that one or more sender accounts 102 is compromised and/or one or more recipient accounts 130 is associated with attackers, such sender accounts 102 and/or recipient accounts 130 can be added to the black list. Thus, fraud detection model 104 provides requestor indicator and/or account level detection.

Thus, in various embodiments, when an incoming request 134 is received and evaluated using fraud detection model 104, the evaluating includes generating updated embedding values for the sender account 102, recipient account 130, and requestor indicator 138 that are associated with the request 134 (and related transactions). In various embodiments, the updated embedding value for the sender account 102 is based on the request 134 as well as the previous embedding value for that particular sender account 102 (or an initialized embedding value for that sender account 102 if the request 134 is the first associated with that sender account 102). In various embodiments, the updated embedding value for the recipient account 130 is based on the request 134, the updated embedding value for the sender account 102, and the previous embedding value for that particular recipient account 130 (or an initialized embedding value for that recipient account 130 if the request 134 is the first associated with that recipient account 130). In various embodiments, the updated embedding value for the requestor indicator 138 is based on the request 134, the updated embedding value for the sender account 102, the updated embedding value for the recipient account 130, and the previous embedding value for that requestor indicator 138 (or an initialized embedding value for that requestor indicator 138 if the request 134 is the first associated with that requestor indicator 138). In various embodiments, these updated embedding values both continue to tune fraud detection model 104 and are useable by fraud detection model 104 to predict whether a particular requestor indicator 138 and/or recipient account 130 is suspected of fraud. In various other embodiments, fraud detection model 104 can additionally or alternatively use the updated embedding value for a particular sender account 102 to predict whether that particular sender account 102 has been compromised. Moreover, because fraud detection model 104 is automatically adjusted by incorporating updated embedding values as requests 134 come in, when a second incoming request 134 is received, the second incoming request 134 is evaluated using the automatically adjusted fraud detection model 104 (and fraud detection model 104 is also automatically adjusted to reflect changes from the second incoming request 134). Accordingly, as additional requests 134 are evaluated, fraud detection model 104 is operable to identify requests 134 that were previously granted that, with additional information from subsequent requests 134, may actually revaluated to be fraudulent. Such granted requests 134 may also be flagged for investigation for possible fraud.

Figure 12:
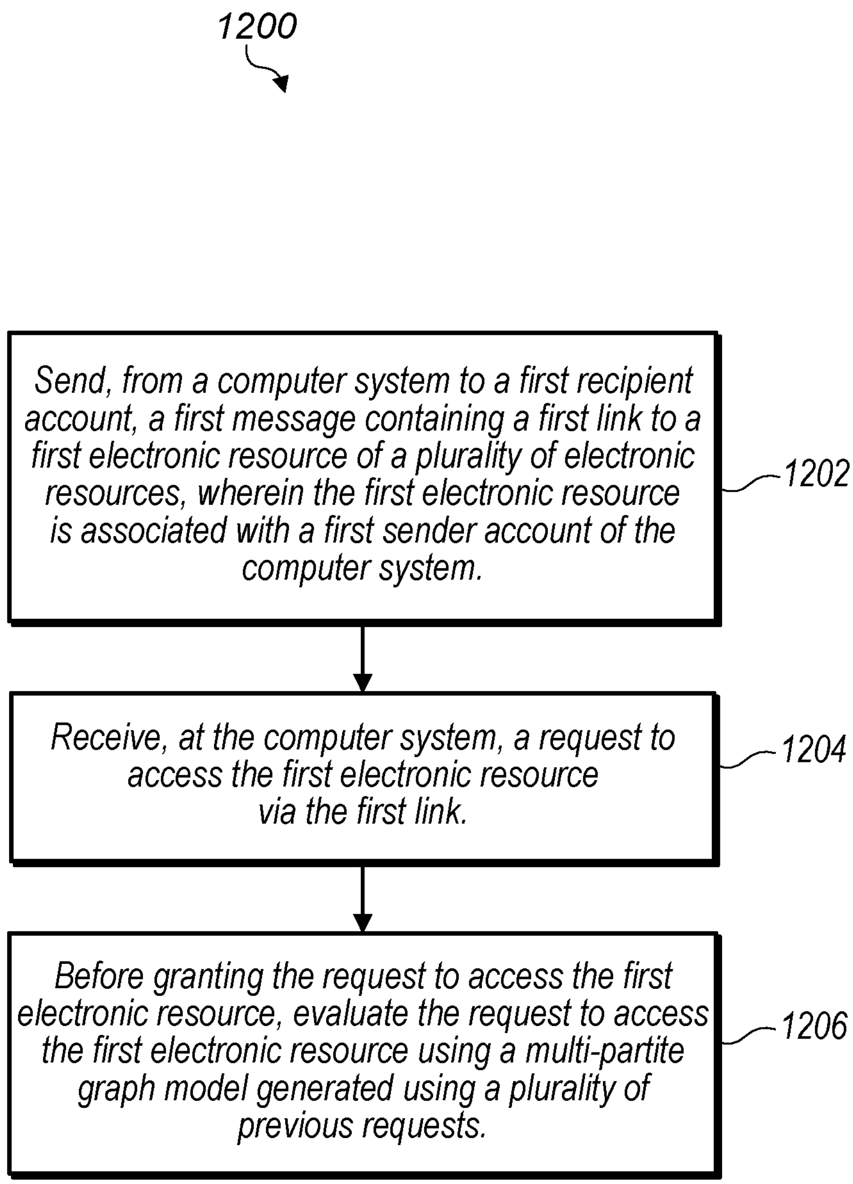
FIG. 12 is a flowchart illustrating another embodiment of an evaluation method in accordance with various embodiments.
Figure 13:
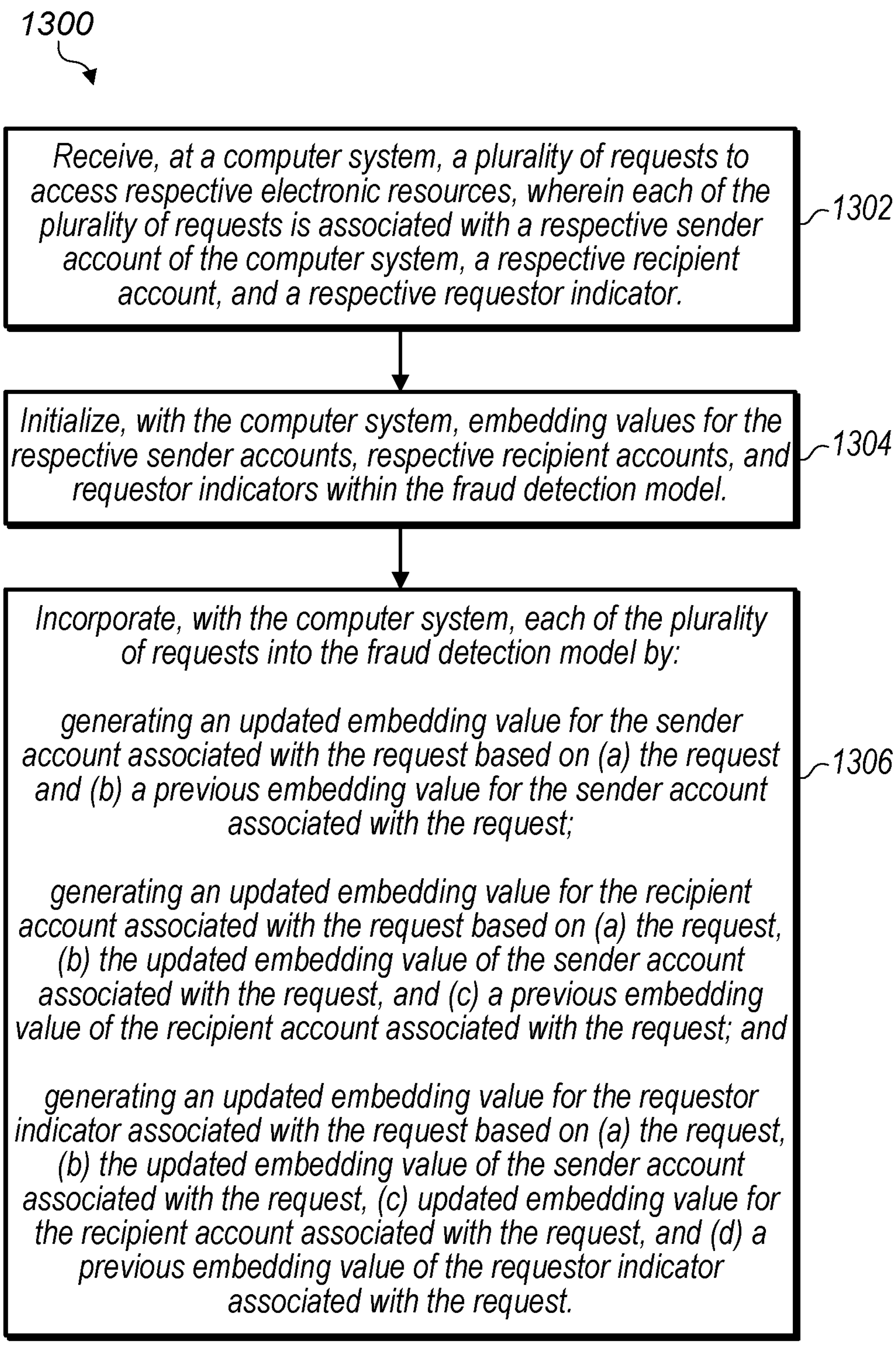
FIG. 13 is a flowchart illustrating another embodiment of a training method in accordance with various embodiments.
Figure 14:
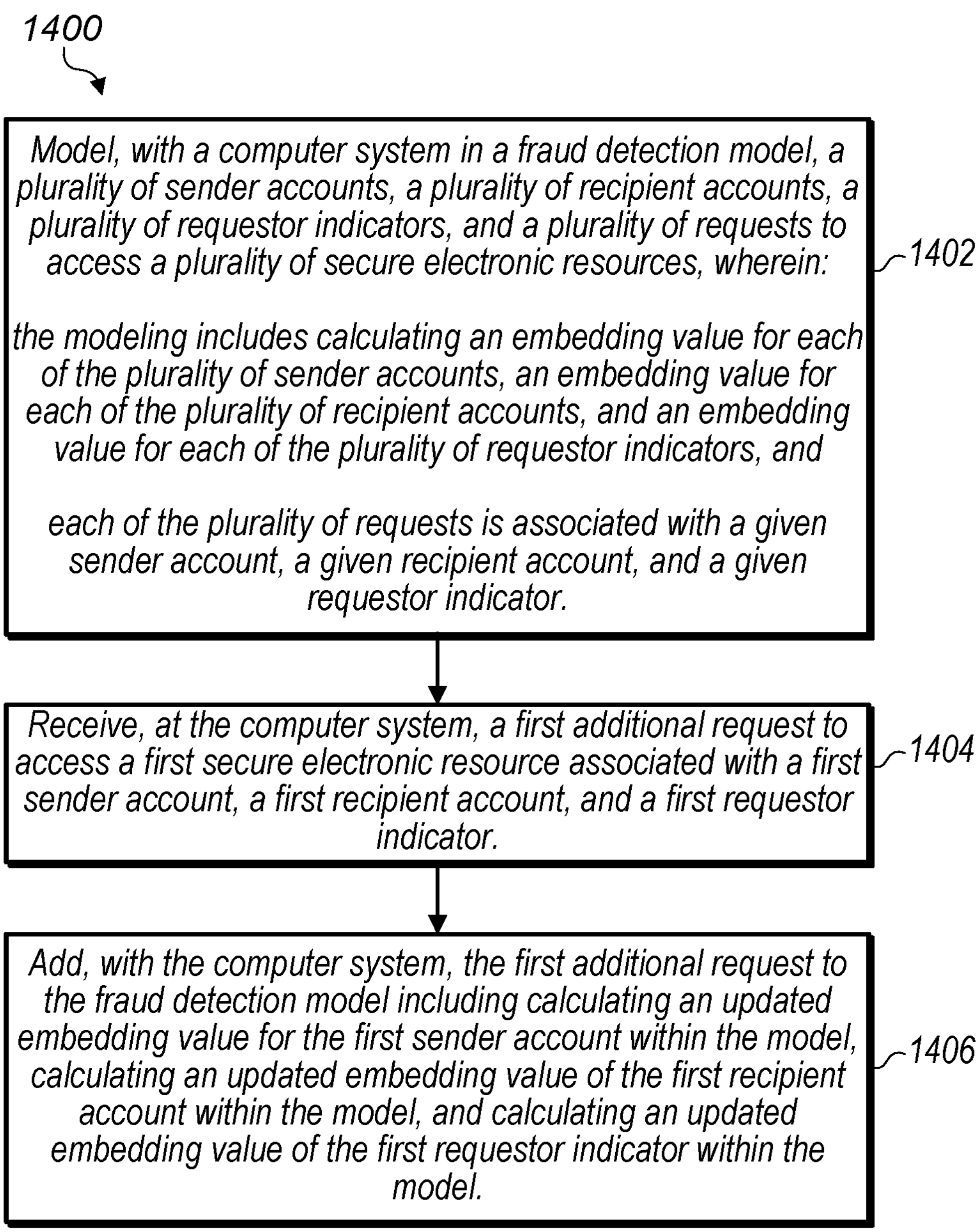
FIG. 14 is a flowchart illustrating another embodiment of an updating method in accordance with various embodiments.

FIGS. 12, 13, and 14 illustrate various flowcharts representing various disclosed methods implemented with the components depicted in FIG. 1. Referring now to FIG. 12, a flowchart depicting an embodiment of an evaluation method 1200 for a request 134 is depicted. In the embodiment shown in FIG. 12, the various actions associated with method 1200 are implemented by computer system 100. In various embodiments, computer system 100 uses training algorithm 1000 and interference algorithm 1100 discussed herein in performing method 1200.

At block 1202, computer system 100 sends to a first recipient account 130, a first message containing a first link 122 to a first electronic resource 120 of a plurality of electronic resources 120. Each of the first electronic resources 120 is associated with a first sender account 102 of computer system 100. At block 604, computer system 100 receives a request 134 to access the first electronic resource 120 via the first link 122. At block 606, before granting the request 134 to access the first electronic resource 120, computer system 100 evaluates the request 134 to access the first electronic resource 120 using a multi-partite graph model generated using a plurality of previous requests. As discussed herein, each of the plurality of previous requests 134 is associated with a sender account 102, a recipient account 130, and a requestor indicator 138 and the multi-partite graph model includes at least a first set of nodes with a first set of embedding values corresponding to respective sender accounts 102, a second set of nodes with a second set of embedding values corresponding to respective recipient accounts 130, and a third set of nodes with a third set of embedding values. In various embodiments, such embedding values are associated with requestor indicators 138.

Referring now to FIG. 13, a flowchart depicting an embodiment of a training method 1300 for model 104 is depicted. In the embodiment shown in FIG. 13, the various actions associated with method 1300 are implemented by computer system 100. In various embodiments, computer system 100 uses training algorithm 1000 discussed herein in performing method 1300.

At block 1302, computer system 100, receives a plurality of requests 134 to access respective electronic resources 120. Each of the plurality of requests 134 is associated with a respective sender account 102 of computer system 100, a respective recipient account 130, and a respective requestor indicator 138. At block 1304, computer system 100 initializes embedding values for the respective sender accounts 102, respective recipient accounts 130, and requestor indicators 138 within fraud detection model 104. At block 1306, computer system 100 incorporates each of the plurality of requests 134 into fraud detection model 104 by generating an updated embedding value for the sender account 102 associated with request 134 based on (a) the particular request 134 and (b) a previous embedding value for the sender account 102 associated with the particular request 134, generating an updated embedding value for the recipient account 130 associated with the particular request 134 based on (a) the particular request 134, (b) the updated embedding value of the sender account 102 associated with the particular request 134, and (c) a previous embedding value of the recipient account 130 associated with the particular request 134; and generating an updated embedding value for the requestor indicator 138 associated with the request 134 based on (a) the request 134, (b) the updated embedding value of the sender account 102 associated with the request 134, (c) updated embedding value for the recipient account 130 associated with the request 134, and (d) a previous embedding value of the requestor indicator 138 associated with the request 134.

Referring now to FIG. 14, a flowchart depicting an updating method 1400 for model 104 is depicted. In the embodiment shown in FIG. 8, the various actions associated with method 800 are implemented by computer system 100. In various embodiments, computer system 100 uses training algorithm 1000 and interference algorithm 1100 discussed herein in performing method 800.

At block 1402, computer system 100 models, in a fraud detection model 104, a plurality of sender accounts 102, a plurality of recipient accounts 130, a plurality of requestor indicators 138, and a plurality of requests 134 to access a plurality of secure electronic resources 120. The modeling calculating an embedding value for each of the plurality of sender accounts 102, an embedding value for each of the plurality of recipient accounts 130, and an embedding value for each of the plurality of requestor indicators. Each of the plurality of requests 134 is associated with a given sender account 102, a given recipient account 130, and a given requestor indicator 138. At block 1404, computer system 100 receives a first additional request 134 to access a first secure electronic resource 120 associated with a first sender account 102, a first recipient account 130, and a first requestor indicator 138. At block 1406, computer system 100 adds the first additional request 134 to the fraud detection model 104 including calculating an updated embedding value for the first sender account 102 within the fraud detection model 104, calculating an updated embedding value of the first recipient account 130 within the fraud detection model 104, and calculating an updated embedding value of the first requestor indicator 138 within the fraud detection model 104.

Exemplary Computer System

Figure 15:
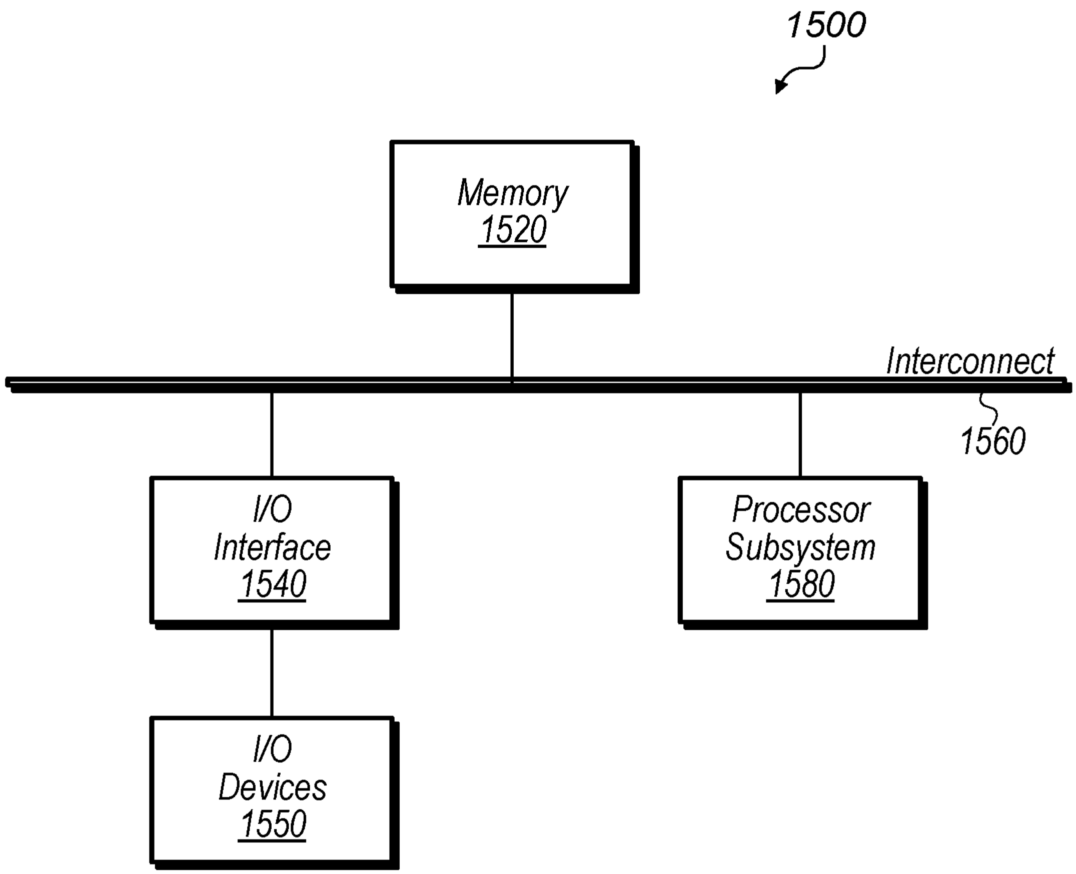
FIG. 15 is a block diagram of an exemplary computer system, which may implement the various components of FIG. 1.

Turning now to FIG. 15, a block diagram of an exemplary computer system 1500, which may implement the various components of computer system 100 is depicted. Computer system 1500 includes a processor subsystem 1580 that is coupled to a system memory 1520 and I/O interfaces(s) 1540 via an interconnect 1560 (e.g., a system bus). I/O interface(s) 1540 is coupled to one or more I/O devices 1550. Computer system 1500 may be any of various types of devices, including, but not limited to, a server system, personal computer system, desktop computer, laptop or notebook computer, mainframe computer system, tablet computer, handheld computer, workstation, network computer, a consumer device such as a mobile phone, music player, or personal data assistant (PDA). Although a single computer system 1500 is shown in FIG. 15 for convenience, system 1500 may also be implemented as two or more computer systems operating together.

Processor subsystem 1580 may include one or more processors or processing units. In various embodiments of computer system 1500, multiple instances of processor subsystem 1580 may be coupled to interconnect 1560. In various embodiments, processor subsystem 1580 (or each processor unit within 1580) may contain a cache or other form of on-board memory.

System memory 1520 is usable to store program instructions executable by processor subsystem 1580 to cause system 1500 perform various operations described herein. System memory 1520 may be implemented using different physical memory media, such as hard disk storage, floppy disk storage, removable disk storage, flash memory, random access memory (RAM-SRAM, EDO RAM, SDRAM, DDR SDRAM, RAMBUS RAM, etc.), read only memory (PROM, EEPROM, etc.), and so on. Memory in computer system 1500 is not limited to primary storage such as memory 1520. Rather, computer system 1500 may also include other forms of storage such as cache memory in processor subsystem 1580 and secondary storage on I/O Devices 1550 (e.g., a hard drive, storage array, etc.). In some embodiments, these other forms of storage may also store program instructions executable by processor subsystem 1580.

I/O interfaces 1540 may be any of various types of interfaces configured to couple to and communicate with other devices, according to various embodiments. In one embodiment, I/O interface 1540 is a bridge chip (e.g., Southbridge) from a front-side to one or more back-side buses. I/O interfaces 1540 may be coupled to one or more I/O devices 1550 via one or more corresponding buses or other interfaces. Examples of I/O devices 1550 include storage devices (hard drive, optical drive, removable flash drive, storage array, SAN, or their associated controller), network interface devices (e.g., to a local or wide-area network), or other devices (e.g., graphics, user interface devices, etc.). In one embodiment, computer system 1500 is coupled to a network via a network interface device 1550 (e.g., configured to communicate over WiFi, Bluetooth, Ethernet, etc.).

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. A method comprising:

receiving, by a computer system from a particular remote computer system associated with a first recipient account, a request to access a first electronic resource associated with a first sender account of the computer system;

accessing, by the computer system, a multi-partite graph model generated using a supervised machine learning training operation;

updating, by the computer system, the multi-partite graph model by updating embedding values of the model, including at least:

generating an updated embedding value for the first sender account based on the request and a previous embedding value for the first sender account; and generating an updated embedding value for the first recipient account based on the request, the previous embedding value for the first recipient account, and the updated embedding value for the first sender account;

generating, by the computer system using the updated multi-partite graph model, a particular embedding value corresponding to a particular requestor indicator of the particular remote computer system that sent the request; and determining, by the computer system based at least on the particular embedding value generated using the updated multi-partite graph model, whether to authorize the request to access the first electronic resource.

2. The method of claim 1, wherein generating the particular embedding value includes generating a prediction score corresponding to the particular requestor indicator of the particular remote computer system using the multi-partite graph model.

3. The method of claim 2, wherein the prediction score indicates a likelihood that a particular requestor indicator for a remote computer system used to send the request to access the first electronic resource has been compromised.

4. The method of claim 1, wherein the multi-partite graph model includes, for a plurality of previous requests:

a first set of embedding values for a first set of nodes that corresponds to respective sender accounts; and a second set of embedding values for a second set of nodes that correspond to respective recipient accounts.

5. The method of claim 4, wherein the multi-partite graph model further includes, for a plurality of previous requests:

a third set of embedding values for a third set of nodes that correspond to a plurality of requestor indicators for a plurality of remote computer systems used to send the plurality of previous requests.

6. The method of claim 4, wherein the supervised machine learning training operation is performed by:

calculating, using a cross entropy loss function, a loss for the second set of embedding values; and back-propagating the calculated loss through the multi-partite graph model.

7. The method of claim 1, wherein the multi-partite graph model is generated, for a given one of a plurality of previous requests, by:

representing a given sender account associated with the given previous request as a first node of a first set of nodes;

representing a given recipient account associated with the given previous request as a second node of a second set of nodes;

representing a given requestor indicator associated with the given previous request as a third node of a third set of nodes; and representing the given previous request as a first edge between the first node and the second node and a second edge between the third node and the second node.

8. The method of claim 1, further comprising:

receiving an additional request to access a second electronic resource;

before granting the additional request to access the second electronic resource, evaluating the additional request using the multi-partite graph model, wherein evaluating the additional request using the multi-partite graph model includes automatically adjusting the multi-partite graph model based on the additional request, including updating embedding values of the model; and determining, using the automatically adjusted multi-partite graph model, whether to authorize the additional request to access the second electronic resource.

9. The method of claim 1, wherein the supervised machine learning training operation is performed based on at least one of: user generated transaction tagging information and tagging information automatically generated by a tagging rules engine.

10. A non-transitory, computer-readable medium having instructions stored thereon that are executable by a computer system to perform operations comprising:

receiving, from a particular remote computer system associated with a first recipient account, a request to access a first electronic resource associated with a first sender account of the computer system;

in response to the request to access the first electronic resource, accessing a multi-partite graph model generated using a supervised machine learning training operation;

updating, the multi-partite graph model by altering embedding values of the model, including at least:

generating an updated embedding value for the first sender account based on the request and a previous embedding value for the first sender account; and generating, using the updated multi-partite graph model, a particular embedding value corresponding to a particular requestor indicator of the particular remote computer system that sent the request; and determining, based at least on the particular embedding value generated using the updated multi-partite graph model, whether to authorize the request to access the first electronic resource.

11. The non-transitory, computer-readable medium of claim 10, wherein updating the multi-partite graph model further includes:

generating an updated embedding value for the first recipient account based on the request, the previous embedding value for the first recipient account, and the updated embedding value for the first sender account.

12. The non-transitory, computer-readable medium of claim 10, wherein generating the particular embedding value includes:

generating a prediction score corresponding to the particular requestor indicator of the particular remote computer system using the multi-partite graph model, wherein the prediction score indicates a likelihood that a particular requestor indicator for a remote computer system used to send the request to access the first electronic resource has been compromised.

13. The non-transitory, computer-readable medium of claim 10, wherein the multi-partite graph model includes, for a plurality of previous requests:

a first set of embedding values for a first set of nodes that corresponds to respective sender accounts;

a second set of embedding values for a second set of nodes that corresponds to respective recipient accounts; and a third set of embedding values for a third set of nodes that corresponds to a plurality of requestor indicators for a plurality of remote computer systems used to send the plurality of previous requests.

14. The non-transitory, computer-readable medium of claim 13, wherein the multi-partite graph model is generated, for a given one of a plurality of previous requests, by:

representing a given sender account associated with the given previous request as a first node of the first set of nodes; and representing a given recipient account associated with the given previous request as a second node of the second set of nodes.

15. The non-transitory, computer-readable medium of claim 14, wherein the multi-partite graph model is generated, for a given one of a plurality of previous requests, by:

representing a given requestor indicator associated with the given previous request as a third node of the third set of nodes; and representing the given previous request as a first edge between the first node and the second node and a second edge between the third node and the second node.

16. A system, comprising:

at least one processor;

a non-transitory, computer-readable medium having instructions stored thereon that are executable by the at least one processor to cause the system to:

receive, from a particular remote computer system associated with a first recipient account, a request to access a first electronic resource associated with a first sender account of the system;

in response to receiving the request to access the first electronic resource, access a multi-partite graph model generated using a supervised machine learning training operation;

update the multi-partite graph model by updating embedding values of the model, including at least:

generating an updated embedding value for the first sender account based on the request and a previous embedding value for the first sender account; and generating an updated embedding value for the first recipient account based on the request, the previous embedding value for the first recipient account, and the updated embedding value for the first sender account;

generate, using the updated multi-partite graph model, a particular embedding value corresponding to a particular requestor indicator of the particular remote computer system that sent the request; and determine, based at least on the particular embedding value generated using the updated multi-partite graph model, whether to authorize the request to access the first electronic resource.

17. The system of claim 16, wherein generating the particular embedding value includes generating a prediction score corresponding to the particular requestor indicator of the particular remote computer system using the multi-partite graph model, and wherein the prediction score indicates a likelihood that a particular requestor indicator for a remote computer system used to send the request to access the first electronic resource has been compromised.

18. The system of claim 16, wherein the multi-partite graph model includes, for a plurality of previous requests:

a first set of embedding values for a first set of nodes that corresponds to respective sender accounts;

a second set of embedding values for a second set of nodes that correspond to respective recipient accounts; and a third set of embedding values for a third set of nodes that correspond to a plurality of requestor indicators for a plurality of remote computer systems used to send the plurality of previous requests.

19. The system of claim 18, wherein the supervised machine learning training operation is performed based on tagging information generated by an automated tagging rules engine, and wherein the supervised machine learning training operation is performed by:

calculating, using a cross entropy loss function, a loss for the second set of embedding values; and back-propagating the calculated loss through the multi-partite graph model.

20. The system of claim 16, wherein the instructions are further executable by the at least one processor to cause the system to further:

receive an additional request to access a second electronic resource;

before granting the additional request to access the second electronic resource, evaluate the additional request using the multi-partite graph model, wherein evaluating the additional request using the multi-partite graph model includes automatically adjusting the multi-partite graph model based on the additional request, including updating embedding values of the model; and determine, using the automatically adjusted multi-partite graph model, whether to authorize the additional request to access the second electronic resource.

* * * * *